United States Patent
Ayuzawa et al.

(10) Patent No.: US 9,387,889 B2
(45) Date of Patent: Jul. 12, 2016

(54) FIBER-REINFORCED PLASTIC CABIN FOR VEHICLE

(71) Applicant: HONDA MOTOR CO., LTD., Minato-Ku, Tokyo (JP)

(72) Inventors: Shotaro Ayuzawa, Wako (JP); Shigeto Yasuhara, Wako (JP)

(73) Assignee: Honda Motor Co., Ltd., Tokyo (JP)

( * ) Notice: Subject to any disclaimer, the term of this patent is extended or adjusted under 35 U.S.C. 154(b) by 0 days.

(21) Appl. No.: 14/405,445

(22) PCT Filed: Apr. 12, 2013

(86) PCT No.: PCT/JP2013/061039
§ 371 (c)(1),
(2) Date: Dec. 4, 2014

(87) PCT Pub. No.: WO2013/183360
PCT Pub. Date: Dec. 12, 2013

(65) Prior Publication Data
US 2015/0137558 A1     May 21, 2015

(30) Foreign Application Priority Data

Jun. 8, 2012 (JP) ................................. 2012-130553
Jun. 15, 2012 (JP) ................................. 2012-135558
Jun. 15, 2012 (JP) ................................. 2012-135559

(51) Int. Cl.
*B62D 25/20*      (2006.01)
*B60G 7/02*      (2006.01)
(Continued)

(52) U.S. Cl.
CPC .............. *B62D 25/2018* (2013.01); *B60G 7/02* (2013.01); *B60G 13/003* (2013.01); *B60N 2/015* (2013.01);
(Continued)

(58) Field of Classification Search
CPC ........... B62D 25/2018; B62D 25/2036; B62D 29/046; B60N 2/015
USPC ............ 296/181.2, 187.08, 193.07, 204, 35.1
See application file for complete search history.

(56) References Cited

U.S. PATENT DOCUMENTS

| 2,230,448 A | * | 2/1941 | Best ....................... B62D 25/20 280/781 |
| 3,940,162 A | * | 2/1976 | Winslow ................ B62D 21/09 280/781 |

(Continued)

FOREIGN PATENT DOCUMENTS

| CN | 87205965 U | 5/1988 |
| JP | 62-112974 U | 7/1987 |

(Continued)

OTHER PUBLICATIONS

Supplementary Search Report dated Mar. 10, 2016 issued in the corresponding European Patent Application 13 80 0273.

*Primary Examiner* — Jason S Morrow
(74) *Attorney, Agent, or Firm* — Carrier Blackman & Associates, P.C.; Joseph P. Carrier; Jingli Wang

(57) ABSTRACT

A suspension subframe is secured to an insert member embedded in a core material of an inclined wall of a dash panel. The core material is formed from corrugated plate having a multiplicity of concave-convex portions extending in the fore-and-aft direction. One apex of the insert member is oriented in the vehicle width direction, and two sides of the insert member, proximate the apex, abut against the core material. When a load in the vehicle width direction is inputted from the suspension system into the subframe, it is possible, by absorbing the load by dispersing it from the two sides sandwiching the apex of the insert member toward the core material of the inclined wall of the dash panel, to enhance the support rigidity of the subframe with respect to the inclined wall of the dash panel without excessively complicating the structure of the insert member.

20 Claims, 15 Drawing Sheets

(51) Int. Cl.
  *B60G 13/00* (2006.01)
  *B62D 25/02* (2006.01)
  *B62D 25/08* (2006.01)
  *B60N 2/015* (2006.01)
  *B62D 29/04* (2006.01)
  *B60N 2/07* (2006.01)
  *B62D 21/11* (2006.01)

(52) U.S. Cl.
  CPC .............. *B60N 2/0715* (2013.01); *B62D 21/11* (2013.01); *B62D 25/025* (2013.01); *B62D 25/082* (2013.01); *B62D 25/088* (2013.01); *B62D 25/2009* (2013.01); *B62D 25/2036* (2013.01); *B62D 25/2045* (2013.01); *B62D 29/043* (2013.01); *B62D 29/046* (2013.01); *B62D 29/048* (2013.01); *B60G 2204/128* (2013.01); *B60G 2204/143* (2013.01); *B60G 2204/15* (2013.01)

(56) References Cited

U.S. PATENT DOCUMENTS

| | | | | |
|---|---|---|---|---|
| 4,705,716 A * | 11/1987 | Tang | .................... | B29C 70/865 296/181.2 |
| 4,887,862 A * | 12/1989 | Bassi | .................... | B62D 21/10 29/469.5 |
| 5,060,975 A | 10/1991 | Sano et al. | | |
| 6,045,174 A * | 4/2000 | Brancaleone | .......... | B60N 2/015 296/204 |
| 6,676,199 B2 * | 1/2004 | Buisson | .................... | B32B 3/12 296/193.07 |
| 8,100,464 B2 * | 1/2012 | Suzaki | .................. | B62D 25/04 296/187.12 |
| 8,128,154 B2 * | 3/2012 | Egawa | ................ | B62D 25/2036 296/187.12 |
| 8,641,128 B2 * | 2/2014 | Edwards | ............ | B62D 25/2054 296/181.1 |
| 2003/0205917 A1 * | 11/2003 | Preisler | .............. | B62D 25/2054 296/193.07 |
| 2005/0099032 A1 * | 5/2005 | Dehart | ................... | B60N 2/015 296/68.1 |
| 2005/0116503 A1 * | 6/2005 | Hartelt | ..................... | B60N 2/24 296/181.2 |
| 2006/0232105 A1 * | 10/2006 | Egawa | ................. | B62D 21/157 296/193.07 |
| 2008/0252104 A1 * | 10/2008 | Yamaguchi | .......... | B62D 21/152 296/203.04 |
| 2009/0230729 A1 * | 9/2009 | Lusk | ..................... | B29C 70/443 296/193.07 |
| 2012/0104793 A1 | 5/2012 | Danielson et al. | | |
| 2012/0126580 A1 | 5/2012 | Gandini | | |
| 2013/0264843 A1 * | 10/2013 | Toba | ...................... | B62D 21/02 296/204 |
| 2014/0147617 A1 * | 5/2014 | Preisler | ................. | B62D 25/00 428/99 |

FOREIGN PATENT DOCUMENTS

| | | |
|---|---|---|
| JP | H02-98078 U | 8/1990 |
| JP | H03-10973 U | 2/1991 |
| JP | 4-11784 U | 1/1992 |
| JP | 5-80977 U | 11/1993 |
| JP | 2006-175606 A | 7/2006 |
| JP | 2008037157 A | 2/2008 |
| JP | 2008-260378 A | 10/2008 |
| JP | 2009-190696 A | 8/2009 |
| JP | 2009-255799 A | 11/2009 |
| JP | 2010-208445 A | 9/2010 |
| JP | 2010-274789 A | 12/2010 |
| WO | 2012140154 A1 | 10/2012 |

* cited by examiner

FIBER-REINFORCED PLASTIC CABIN FOR VEHICLE

TECHNICAL FIELD

The present invention relates to a fiber-reinforced plastic cabin for a vehicle, in which a fiber-reinforced plastic cabin includes a floor panel formed by sandwiching a core material between an inner skin positioned on an inside of a vehicle compartment and an outer skin positioned on an outside of the vehicle compartment, and a subframe supporting a suspension system is secured to an insert member embedded in the core material.

BACKGROUND ART

An arrangement in which an insert embedded at a predetermined position in a CFRP (carbon fiber-reinforced resin) is formed from a balsa core material, a metal insert member retained in the interior of the core material, and a CFRP covering layer covering the surfaces of the core material and the insert member is known from Patent Document 1 below.

An arrangement in which a floor panel of a cabin for a vehicle molded into a bathtub shape from a CFRP is formed by sandwiching a foam core between an upper wall and a lower wall, a washer is made to abut from the upper wall side against the upper end of a metal collar main body inserted into the floor panel from the lower wall side to the upper wall side, and a bolt extending through a seat rail and a washer is screwed into the collar main body to thus fix a seat to the floor panel is known from Patent Document 2 below.

RELATED ART DOCUMENTS

Patent Documents

Patent Document 1: Japanese Patent Application Laid-open No. 2006-175606
Patent Document 2: Japanese Patent Application Laid-open No. 2010-208445

SUMMARY OF THE INVENTION

Problems to be Solved by the Invention

The arrangement disclosed in Patent Document 1 above has the problem that, since the insert is formed from the core material, the insert member, and the covering layer, not only does the structure of the insert become complicated to thus result in an increase in cost, but also the dimensions increase and there is thus a failure to provide multi-purpose features.

Furthermore, with regard to the arrangement disclosed in Patent Document 2 above, since the collar main body as the insert member is a simple cylindrical member, and it is difficult to efficiently transmit a load inputted into the collar main body to the foam core, it is necessary to embed a carbon fiber-reinforced plastic cylindrical insert body abutting against an outer peripheral face of the collar main body in the foam core so as to reinforce it, and there is the problem that the number of components increases to thus result in an increase in cost.

The present invention has been accomplished in light of the above circumstances, and it is an object thereof to enhance the load supporting performance of an insert member embedded in a fiber-reinforced plastic floor panel when securing a subframe supporting a suspension system to the insert member.

Means for Solving the Problems

In order to attain the above object, according to a first aspect of the present invention, there is provided a fiber-reinforced plastic cabin for a vehicle, in which a fiber-reinforced plastic cabin comprises a floor panel formed by sandwiching a core material between an inner skin positioned on an inside of a vehicle compartment and an outer skin positioned on an outside of the vehicle compartment, and a subframe supporting a suspension system is secured to an insert member embedded in the core material, wherein the core material is formed from a corrugated plate having a large number of concave-convex portions extending in a fore-and-aft direction, one apex of the insert member, which forms a triangular shape when viewed from above, is directed to the outside or the inside in a vehicle width direction, and two sides sandwiching the apex abut against the core material.

Further, according to a second aspect of the present invention, in addition to the first aspect, a subframe support member, which supports the subframe, is secured to the insert member at three apexes of the triangle, a bulge portion bulging into the insert member is formed on the subframe support member, and a bolt hole into which a bolt securing the subframe (91) to the subframe support member is screwed extends to an interior of the bulge portion.

Furthermore, according to a third aspect of the present invention, in addition to the first or second aspect, in a state in which the outer skin is sandwiched between the subframe support member and the insert member, the insert member and the subframe support member are secured by a first bolt inserted into a securing hole, formed in the insert member, from the inner skin side, and the inner skin is secured to the insert member by a second bolt inserted into the securing hole from the inner skin side.

Moreover, according to a fourth aspect of the present invention, in addition to any one of the first to third aspects, the cabin comprises side sills extending rearwardly from opposite sides in the vehicle width direction of the floor panel, and a front end of a partition member partitioning an interior of the side sill into an upper space and a lower space is positioned in the vicinity of the insert member.

Further, according to a fifth aspect of the present invention, in addition to any one of the first to fourth aspects, a front floor panel connected to the rear of the floor panel is formed by sandwiching between the inner skin and the outer skin a core material comprising a corrugated plate having a large number of concave-convex portions extending in the fore-and-aft direction, the concave-convex portion of the core material of the floor panel being continuous with the concave-convex portion of the core material of the front floor panel.

Furthermore, according to a sixth aspect of the present invention, in addition to the first aspect, a front floor panel, which provides a connection between left and right side sills of the cabin, is formed by sandwiching a core material between the inner skin and the outer skin, the front floor panel is divided into left and right front regions and left and right rear regions by a floor tunnel extending in the fore-and-aft direction in a middle part in the vehicle width direction of the inner skin and a cross member extending in the vehicle width direction in a middle part in the fore-and-aft direction of the inner skin, the core material in the left and right front regions comprises a concave-convex portion extending in a ripple shape forwardly and inwardly in the vehicle width direction from the cross member and the side sill, and the core material in the left and right rear regions comprises a concave-convex portion extending in a ripple shape rearwardly and inwardly in the vehicle width direction from the cross member and the side sill.

Moreover, according to a seventh aspect of the present invention, in addition to the sixth aspect, the core material in the left and right front regions comprises the concave-convex portion extending in a ripple shape with a front side of the side sill connected thereto as a center, and the core material in the left and right rear regions comprises the concave-convex portion extending in a ripple shape with a rear side of the side sill connected thereto as a center.

Further, according to an eighth aspect of the present invention, in addition to the seventh aspect, the core material in the left and right front regions comprises a linear concave-convex portion extending forwardly from an end part of the ripple-shaped concave-convex portion, and the core material in the left and right rear regions comprises a linear concave-convex portion extending rearwardly from an end part of the ripple-shaped concave-convex portion.

Furthermore, according to a ninth aspect of the present invention, in addition to the eighth aspect, the cabin comprises a dash panel formed from the floor panel extending in an inclined manner obliquely upwardly from a front end of the front floor panel and a vertical wall extending upwardly from the front end of the floor panel, the floor panel is formed by sandwiching the core material between the inner skin and the outer skin, and the concave-convex portion formed in the core material of the floor panel and extending linearly in the fore-and-aft direction is connected to the linear concave-convex portion of the core material in the left and right front regions.

Moreover, according to a tenth aspect of the present invention, in addition to any one of the sixth to ninth aspects, an inclined face extending in the fore-and-aft direction is formed on a border between the front floor panel and the side sill in the inner skin, and the inclined face and the outer skin are joined to a frame member extending in the fore-and-aft direction.

Further, according to an eleventh aspect of the present invention, in addition to the tenth aspect, the frame member is a tubular hollow member.

Furthermore, according to a twelfth aspect of the present invention, in addition to any one of the sixth to eleventh aspects a rear wall extending in the vehicle width direction rises from a rear end of the front floor panel, and opposite end parts in the vehicle width direction of the rear wall protrude into a cross section of the side sill.

Moreover, according to a thirteenth aspect of the present invention, in addition to the first aspect, the inner skin comprises a front cross member extending in the vehicle width direction while having a front wall, an upper wall, and a rear wall, and a rear cross member extending in the vehicle width direction while having a front wall, an upper wall and a rear wall, a front insert member supporting a front part of a seat is fixed to the front wall of the front cross member, and a rear insert member supporting a rear part of the seat is fixed to the upper wall of the rear cross member and the outer skin.

Further, according to a fourteenth aspect of the present invention, in addition to the thirteenth aspect, the front insert member comprises a main body part having a flange, and a washer having a diameter that is the same as that of the flange or greater and fitted to the main body part, the flange is adhered to a reverse face of the front wall of the front cross member, and the washer is adhered to a face of the front wall of the front cross member.

Furthermore, according to a fifteenth aspect of the present invention, in addition to the thirteenth or fourteenth aspect, the rear insert member is fitted to reverse faces of the front wall, the upper wall, and the rear wall of the rear cross member, and comprises a main body part abutting against the reverse face of the outer skin and fixed by a bolt, and a washer press fitted to the main body part with the upper wall of the rear cross member sandwiched therebetween.

Moreover, according to a sixteenth aspect of the present invention, in addition to any one of the thirteenth to fifteenth aspects, the cabin comprises a side sill connected integrally to an outer side in the vehicle width direction of the floor panel, an inclined face extending in the fore-and-aft direction is formed on a border between the floor panel and the side sill in the inner skin, the inclined face and the outer skin are joined by a frame member extending in the fore-and-aft direction, and the height of the front cross member is set so as to substantially coincide with the height of the inclined face.

Further, according to a seventeenth aspect of the present invention, in addition to any one of the thirteenth to sixteenth aspects, front halves of the left and right core materials sandwiching the vehicle body center line comprise a concave-convex portion formed into a ripple shape with a front side of the side sill connected thereto as a center, rear halves of the left and right core materials sandwiching the vehicle body center line comprise a concave-convex portion formed into a ripple shape with a rear side of the side sill connected thereto as a center, and the front cross member is positioned on a border between the front half and the rear half of the core material.

A kick-up part 26 of an embodiment corresponds to the rear wall of the present invention, an inclined wall 37 of the embodiment corresponds to the floor panel of the present invention, a front cross member 40 of the embodiment corresponds to the cross member of the wheel house of the present invention, a ripple-shaped concave-convex portion 42*a* of the embodiment corresponds to the concave-convex portion of the present invention, a linear concave-convex portion 43*a* of the embodiment corresponds to the concave-convex portion of the present invention, a front partition member 47 of the embodiment corresponds to the partition member of the present invention, a front subframe 91 of the embodiment corresponds to the subframe of the present invention, a front insert member 93 of the embodiment corresponds to the insert member of the present invention, and a bolt hole 93*a*, a large diameter hole 93*b*, and a small diameter hole 93*c* of the embodiment correspond to the securing hole of the present invention.

Effects of the Invention

In accordance with the first aspect of the present invention, the fiber-reinforced plastic cabin includes the floor panel formed by sandwiching the core material between the inner skin positioned on the inside of the vehicle compartment and the outer skin positioned on the outside of the vehicle compartment, and the subframe supporting the suspension system is secured to the insert member embedded in the core material. Since the core material is formed from the corrugated plate having a large number of concave-convex portions extending in the fore-and-aft direction, one apex of the insert member, which forms a triangular shape when viewed from above, is oriented outside or inside in the vehicle width direction, and the two sides sandwiching the apex abut against the core material, when a load in the vehicle width direction is inputted from the suspension system into the subframe, it is possible, by absorbing the load by dispersing it from the two sides sandwiching the apex of the insert member toward the core material of the floor panel, to enhance the support rigidity of the subframe with respect to the floor panel without complicating the structure of the insert member.

Furthermore, in accordance with the second aspect of the present invention, since the subframe support member supporting the front subframe is secured to the insert member at the three apexes of the triangular shape, the bulge portion that bulges into the insert member is formed on the subframe support member, and the bolt hole into which the bolt securing the subframe to the subframe support member is screwed extends into the bulge portion, it is possible to enhance the tightening force by forming the bolt hole into which the bolt securing the subframe to the subframe support member is screwed so that it is long while reducing the dimensions of the subframe support member so as to decrease the amount thereof projecting from the insert member.

Moreover, in accordance with the third aspect of the present invention, since, in a state in which the outer skin is sandwiched between the subframe support member and the insert member, the insert member and the subframe support member are secured by means of the first bolt inserted from the inner skin side into the securing hole formed in the insert member, and the inner skin is secured to the insert member by means of the second bolt inserted into the securing hole from the inner skin side, it becomes possible to insert the first bolt and the second bolt into the common securing hole from the inner skin side, thus not only enhancing the workability by enabling the first and second bolts to be operated from the vehicle compartment side, which the inner skin faces, but also simplifying the structure by reducing the number of securing holes. Furthermore, since the securing hole does not open on the outer skin side, it is possible to prevent water, etc. from entering the vehicle compartment side through the securing hole.

Furthermore, in accordance with the fourth aspect of the present invention, since the cabin includes the side sills extending rearwardly from left and right sides in the vehicle width direction of the floor panel, and the front end of the partition member partitioning the interior of the side sill into the upper space and the lower space is positioned in the vicinity of the insert member, it is possible to support a load inputted from the insert member into the core material of the floor panel by efficiently dispersing it to the side sill via the partition member.

Moreover, in accordance with the fifth aspect of the present invention, since the front floor panel connected to the rear of the floor panel is formed by sandwiching the core material, which is a corrugated plate having a large number of concave-convex portions extending in the fore-and-aft direction, between the inner skin and the outer skin, and the concave-convex portions of the core material of the floor panel are continuous with the concave-convex portions of the core material of the front floor panel, it is possible to support a load inputted from the insert member into the core material of the floor panel by efficiently dispersing it to the core material of the front floor panel.

Furthermore, in accordance with the sixth aspect of the present invention, the front floor panel connecting the left and right side sills of the cabin is formed by sandwiching the core material between the inner skin and the outer skin. Since the front floor panel is divided into left and right front regions and left and right rear regions by means of the floor tunnel extending in the fore-and-aft direction in the middle part in the vehicle width direction of the inner skin and the cross member extending in the vehicle width direction in the middle part in the fore-and-aft direction of the inner skin, the core material in the left and right front regions includes the concave-convex portion extending in a ripple shape forwardly and inwardly in the vehicle width direction from the cross member and the side sill, and the core material in the left and right rear regions includes the concave-convex portion extending in a ripple shape rearwardly and inwardly in the vehicle width direction from the cross member and the side sill, the collision load of a side collision inputted into an intermediate part in the fore-and-aft direction of the side sill is dispersed forwardly from the side sill and the cross member via the concave-convex portion of the core material in the front region, is dispersed rearwardly from the side sill and the cross member via the concave-convex portion of the core material in the rear region, and is efficiently absorbed. In particular, since the core material is made of a fiber-reinforced plastic, the concave-convex portion can be formed so that it is deep and, moreover, not only is it possible to efficiently transmit a collision load since the core material is sandwiched between the inner skin and the outer skin to thus enhance the strength of the front floor panel, but it is also possible to reliably transmit to the concave-convex portion a collision load that has been transmitted from the side sill to the cross member since the concave-convex portion also extends from the cross member.

Furthermore, in accordance with the seventh aspect of the present invention, since the core material in the left and right front regions includes the concave-convex portion extending in a ripple shape with the front side of the side sill connected thereto as the center, and the core material in the left and right rear regions includes the concave-convex portion extending in a ripple shape with the rear side of the side sill connected thereto as the center, it is possible to curve the concave-convex portion smoothly, thus enhancing the efficiency in transmitting a load.

Moreover, in accordance with the eighth aspect of the present invention, since the core material in the left and right front regions includes the linear concave-convex portion extending forwardly from an end part of the ripple-shaped concave-convex portion, even if the dimension in the fore-and-aft direction of the core material in the left and right front regions is large, a collision load that has been dispersed forwardly can be transmitted forwardly in a straight line and, furthermore, since the core material in the left and right rear regions includes the linear concave-convex portion extending rearwardly from an end part of the ripple-shaped concave-convex portion, even if the dimension in the fore-and-aft direction of the core material in the left and right rear regions is large, a collision load that has been dispersed rearwardly can be transmitted rearwardly in a straight line.

Moreover, in accordance with the ninth aspect of the present invention, the cabin includes the floor panel extending in an inclined manner obliquely upwardly from the front end of the front floor panel, and the dash panel formed from the vertical wall extending upwardly from the front end of the floor panel, and the floor panel is formed by sandwiching the fiber-reinforced plastic core material between the inner skin and the outer skin. Since the concave-convex portion formed in the core material of the floor panel and extending linearly in the fore-and-aft direction is connected to the linear concave-convex portion of the core material in the left and right front regions, when the collision load of a side collision that has been dispersed forwardly is transmitted from the core material in the left and right front regions to the core material of the dash panel, it is possible to support the forwardly dispersed collision load by means of the floor panel of the dash panel even when the vertical wall of the dash panel is made thin.

Furthermore, in accordance with the tenth aspect of the present invention, since the inclined face extending in the fore-and-aft direction is formed on the border between the front floor panel and the side sill in the inner skin, and the inclined face and the outer skin are joined by means of the frame member extending in the fore-and-aft direction, when a bending moment that works so as to collapse the side sill inwardly in the vehicle width direction is applied by means of the collision load of a side collision it is possible to prevent the side sill from collapsing without increasing the number of cross members or increasing the height of a cross member by means of the inclined face of the inner skin transmitting the bending moment to the front floor panel and supporting it. Furthermore, since the inclined face of the inner skin and the outer skin are joined to the frame member extending in the fore-and-aft direction, not only is it possible to suppress deformation of the inclined face, but it is also possible to further reliably prevent the side sill from collapsing by transmitting the bending moment to the outer skin via the frame member.

Moreover, in accordance with the eleventh aspect of the present invention, since the frame member is a tubular hollow member, it is possible to easily produce the frame member by extrusion molding or draw molding.

Furthermore, in accordance with the twelfth aspect of the present invention, since the rear wall extending in the vehicle width direction rises from the rear end of the front floor panel, and the opposite end parts in the vehicle width direction of the rear wall protrude within the cross section of the side sill, when the collision load of a side collision is inputted into the rear part of the side sill, the collision load can be transmitted efficiently from the rear wall to the front floor panel.

Moreover, in accordance with the thirteenth aspect of the present invention, the inner skin includes the front cross member extending in the vehicle width direction and having the front wall, the upper wall, and the rear wall, and the rear cross member extending in the vehicle width direction and having the front wall, the upper wall, and the rear wall. Since the front insert member supporting the front part of the seat is fixed to the front wall of the front cross member, and the rear insert member supporting the rear part of the seat is fixed to the outer skin and the upper wall of the rear cross member, it is possible to strongly fix the front insert member and the rear insert member, to which a large load is applied from the seat, to the front cross member and the rear cross member, which have a high strength. Furthermore, when a forward-facing inertial force acts on the seat due to a frontal collision, an upward-facing load acts on the rear insert member so as to pull the rear cross member away from the front floor panel, and high strength is required, but fixing the rear insert member to both the rear cross member and the outer skin enables the upward-facing load to be reliably supported. On the other hand, when there is a frontal collision, since a downward-facing load acts on the front insert member so as to press the front cross member against the front floor panel, only low strength is required, and fixing the front insert member only to the front cross member enables the size of the front insert member to be reduced, thus decreasing the weight.

Moreover, in accordance with the fourteenth aspect of the present invention, since the front insert member is formed from the main body part having the flange and the washer having a diameter that is the same as or greater than that of the flange and fitted to the main body part, the flange is adhered to the reverse face of the front wall of the front cross member, and the washer is adhered to the face of the front wall of the front cross member, it is possible to strongly support a load in the fore-and-aft direction applied from the seat to the front insert member by transmitting it to the front cross member, thus enhancing the seating comfort and, moreover, since the front insert member is positioned on the front face of the front cross member, detaching and attaching the seat is easy.

Furthermore, in accordance with the fifteenth aspect of the present invention, since the rear insert member is formed from the main body part fitted to the reverse faces of the front wall, the upper wall, and the rear wall of the rear cross member and fixed by the bolts to the reverse face of the outer skin so as to abut thereagainst, and the washer press fitted to the main body part with the upper wall of the rear cross member sandwiched therebetween, it is possible, by strongly supporting a load in the fore-and-aft direction applied from the seat to the rear insert member by transmitting it to the rear cross member and the outer skin, thus enhancing the seating comfort, and even when a large load in the fore-and-aft direction is applied when there is a frontal collision, it is possible to strongly fix the seat without reinforcing the front floor panel by specially making it thick.

Moreover, in accordance with the sixteenth aspect of the present invention, since the side sill is provided so as to be connected integrally to the outer side in the vehicle width direction of the front floor panel, the inclined face extending in the fore-and-aft direction is formed on the border between the front floor panel and the side sill in the inner skin, and the inclined face and the outer skin are joined by means of the frame member extending in the fore-and-aft direction, when a bending moment that works so as to collapse the side sill inwardly in the vehicle width direction is applied by means of the collision load of a side collision, it is possible to prevent the side sill from collapsing without increasing the number of cross members or increasing the height of a cross member, by means of the inclined face of the inner skin transmitting the bending moment to the front floor panel and supporting it. Furthermore, since the inclined face of the inner skin and the outer skin are joined to the frame member extending in the fore-and-aft direction, not only is it possible to suppress deformation of the inclined face, but it is also possible to further reliably prevent the side sill from collapsing by transmitting the bending moment to the outer skin via the frame member.

Furthermore, in accordance with the seventeenth aspect of the present invention, since the front halves of the left and right core materials sandwiching the vehicle body center line include the concave-convex portions formed into a ripple shape with the front sides of the side sills connected thereto as the center, the rear halves of the left and right core materials sandwiching the vehicle body center line include the concave-convex portions formed into a ripple shape with the rear side of the side sill connected thereto as the center, and the front cross member is positioned on the border between the front half and the rear half of the core material, the collision load of a side collision inputted into the intermediate part in the fore-and-aft direction of the side sill is dispersed forwardly from the side sill and cross member via the concave-convex portion of the core material in the front region, is also dispersed rearwardly from the side sill and cross member via the concave-convex portion of the core material in the rear region, and is efficiently absorbed. In particular, since the core material is made of a fiber-reinforced plastic, the concave-convex portion can be formed so that it is deep and, moreover, not only is it possible to efficiently transmit a collision load since the core material is sandwiched between the inner skin and the outer skin to thus enhance the strength of the front floor panel, but it is also possible to reliably transmit to the concave-convex portion a collision load that has been transmitted from the side sill to the cross member since the concave-convex portion also extends from the cross member.

EXPLANATION OF REFERENCE NUMERALS AND SYMBOLS

Figure 1:
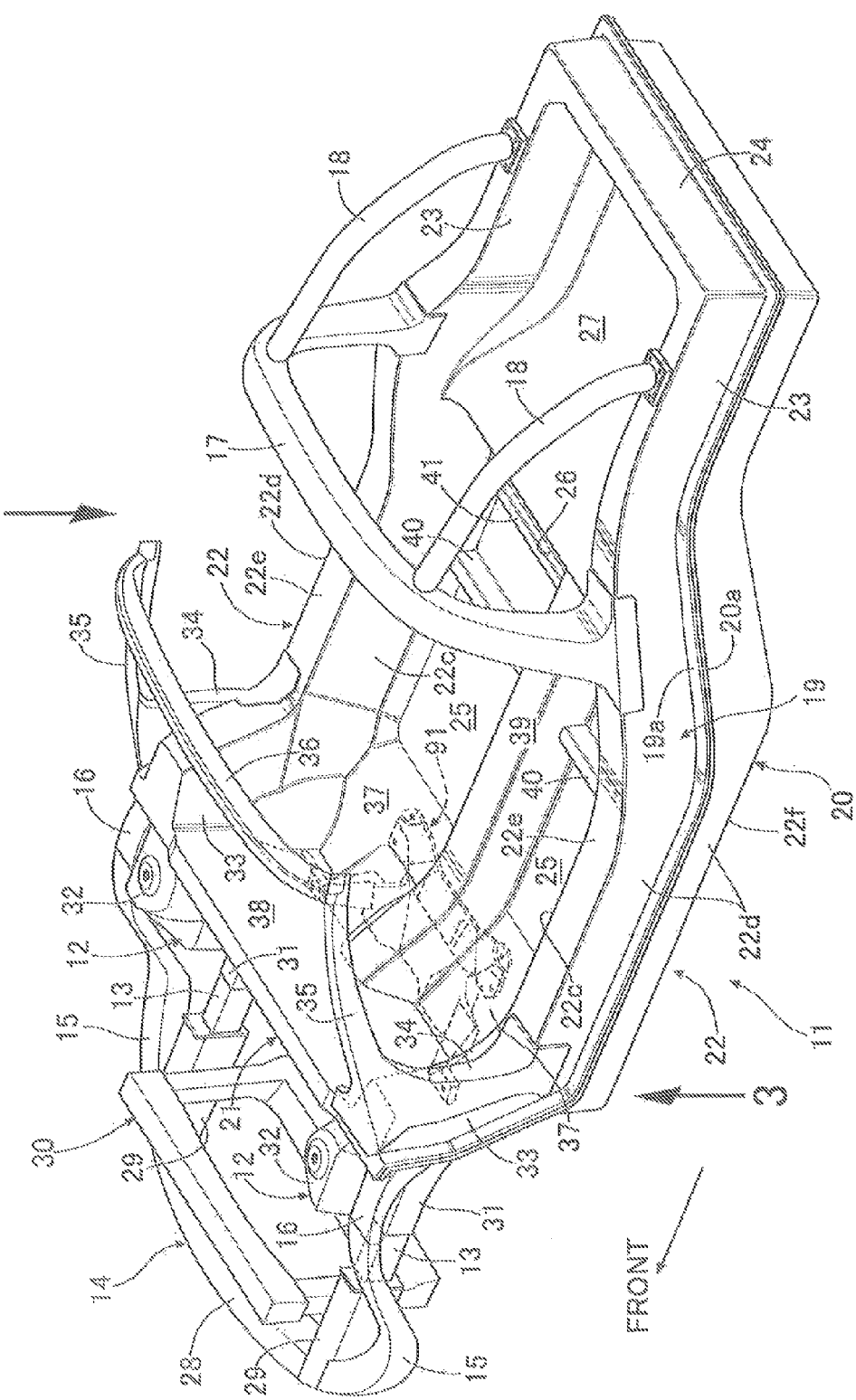
FIG. 1 is a perspective view of a CFRP cabin for a vehicle. (first embodiment)

11 Cabin
19 Inner skin
19b Inclined face
20 Outer skin
21 Dash panel
22 Side sill
22a Upper space
22b Lower space
25 Front floor panel
26 Kick-up part (rear wall)
37 Inclined wall (floor panel)
38 Vertical wall
39 Floor tunnel
40 Front cross member (cross member)
40a Front wall
40b Upper wall
40c Rear wall
41 Rear cross member
41a Front wall
41b Upper wall
41c Rear wall
42 Core material of floor panel
42a Ripple-shaped concave-convex portion (concave-convex portion)
42b Linear concave-convex portion
42c Ripple-shaped concave-convex portion
42d Linear concave-convex portion
43 Core material of inclined wall
43a Linear concave-convex portion (concave-convex portion)
47 Front partition member (partition member)
59 Frame member
74 Seat
81 Front insert member
83 Rear insert member
85 Main body part
85a Flange
86 Washer
87 Main body part
88 Washer
89 Bolt
90 Suspension system
91 Front subframe (subframe)
93 Front insert member (insert member)
93a Bolt hole (securing hole)
93b Large diameter hole (securing hole)
93c Small diameter hole (securing hole)
94 Subframe support member
94b Bulge portion
94e Bolt hole
95 Bolt
98 First bolt
99 Second bolt
O1 Center on front side of side sill
O2 Center on rear side of side sill

MODES FOR CARRYING OUT THE INVENTION

Modes for carrying out the present invention are explained below by reference to the attached drawings.

First Embodiment

A first embodiment of the present invention is now explained by reference to FIG. 1 to FIG. 6. The fore-and-aft direction, the left-and-right direction (vehicle width direction), and the up-and-down direction in the present specification are with reference to a driver seated on a driver's seat.

As shown in FIG. 1, a vehicle body frame of a vehicle includes a cabin 11 formed into a bathtub shape from a carbon fiber-reinforced resin (CFRP), a pair of left and right suspension support modules 12 and 12, which are aluminum alloy castings connected to the front end of the cabin 11, a pair of left and right front side frame front parts 13 and 13, which are aluminum alloy extrusions extending forwardly from the front ends of the suspension support modules 12 and 12, a carbon fiber-reinforced plastic front end module 14 supported at the front ends of the front side frame front parts 13 and 13, a pair of left and right carbon fiber-reinforced plastic lower members 15 and 15 extending upwardly to the rear from left and right ends of the front end module 14, a pair of left and right carbon fiber-reinforced plastic upper members 16 and 16 extending upwardly to the rear from the rear ends of the lower members 15 and 15 and connected to the front end of the cabin 11, a carbon fiber-reinforced plastic roll bar 17 standingly providing on a rear upper face of the cabin 11, and a pair of left and right carbon fiber-reinforced plastic stays 18 and 18 reinforcing the roll bar 17 by supporting it from the rear.

The cabin 11 is a hollow structure formed by joining an inner skin 19 and an outer skin 20 one above the other, and includes a dash panel 21 at the front end, a pair of left and right side sills 22 and 22 extending rearwardly from opposite ends in the vehicle width direction of the dash panel 21, a pair of left and right rear side frames 23 and 23 extending upwardly to the rear from the rear ends of the side sills 22 and 22, a rear end cross member 24 providing a connection between the rear ends of the rear side frames 23 and 23 in the vehicle width direction, a front floor panel 25 providing a connection between the dash panel 21 and the left and right side sills 22 and 22, a kick-up part 26 rising from the rear end of the front floor panel 25, and a rear floor panel 27 extending rearwardly from the upper end of the kick-up part 26 and connected to the rear side frames 23 and 23 and the rear end cross member 24.

The front end module 14 includes a bumper beam 28 extending in the vehicle width direction, a pair of left and right bumper beam extensions 29 and 29 extending rearwardly from opposite end parts in the vehicle width direction of the bumper beam 28 and connected to the front ends of the front side frame front parts 13 and 13, and a frame-shaped front bulkhead 30 supported between the bumper beam extensions 29 and 29. Each suspension support module 12 integrally includes a front side frame rear part 31 connected to the rear end of the front side frame front part 13 and a front face of the dash panel 21, and a damper housing 32 extending upwardly and outwardly in the vehicle width direction from the front side frame rear part 31 and connected to the front face of the dash panel 21. Left and right end parts of the dash panel 21 form a pair of left and right front pillar lower front parts 33 and 33 rising upwardly from the front ends of the side sills 22 and 22. A pair of left and right metal front pillar lower rear parts 34 and 34 and a pair of left and right metal front pillar uppers 35 and 35 are connected to rear faces of the front pillar lower front parts 33 and 33, and the upper ends of the left and right front pillar uppers 35 and 35 are connected to each other by a metal front roof arch 36, which extends in the vehicle width direction.

The dash panel 21 includes an inclined wall 37 extending obliquely upwardly from the front end of the front floor panel 25, and a vertical wall 38 extending upwardly from the front end of the inclined wall 37. A floor tunnel 39 extending in the fore-and-aft direction bulges upwardly from middle parts in the vehicle width direction of the inner skin 19 and the outer skin 20 forming upper and lower faces of the front floor panel 25 and the inclined wall 37 of the dash panel 21. Furthermore, a front cross member 40 and a rear cross member 41, which intersect the floor tunnel 39 and extend in the vehicle width direction, bulge upwardly from the inner skin 19 forming the upper face of the front floor panel 25. On the other hand, the rear floor panel 27 is formed so that the inner skin 19 and the outer skin 20 are both flat.

A front subframe 91 supporting a suspension system 90 (see FIG. 3) for left and right front wheels is fitted beneath the dash panel 21.

Figure 2:
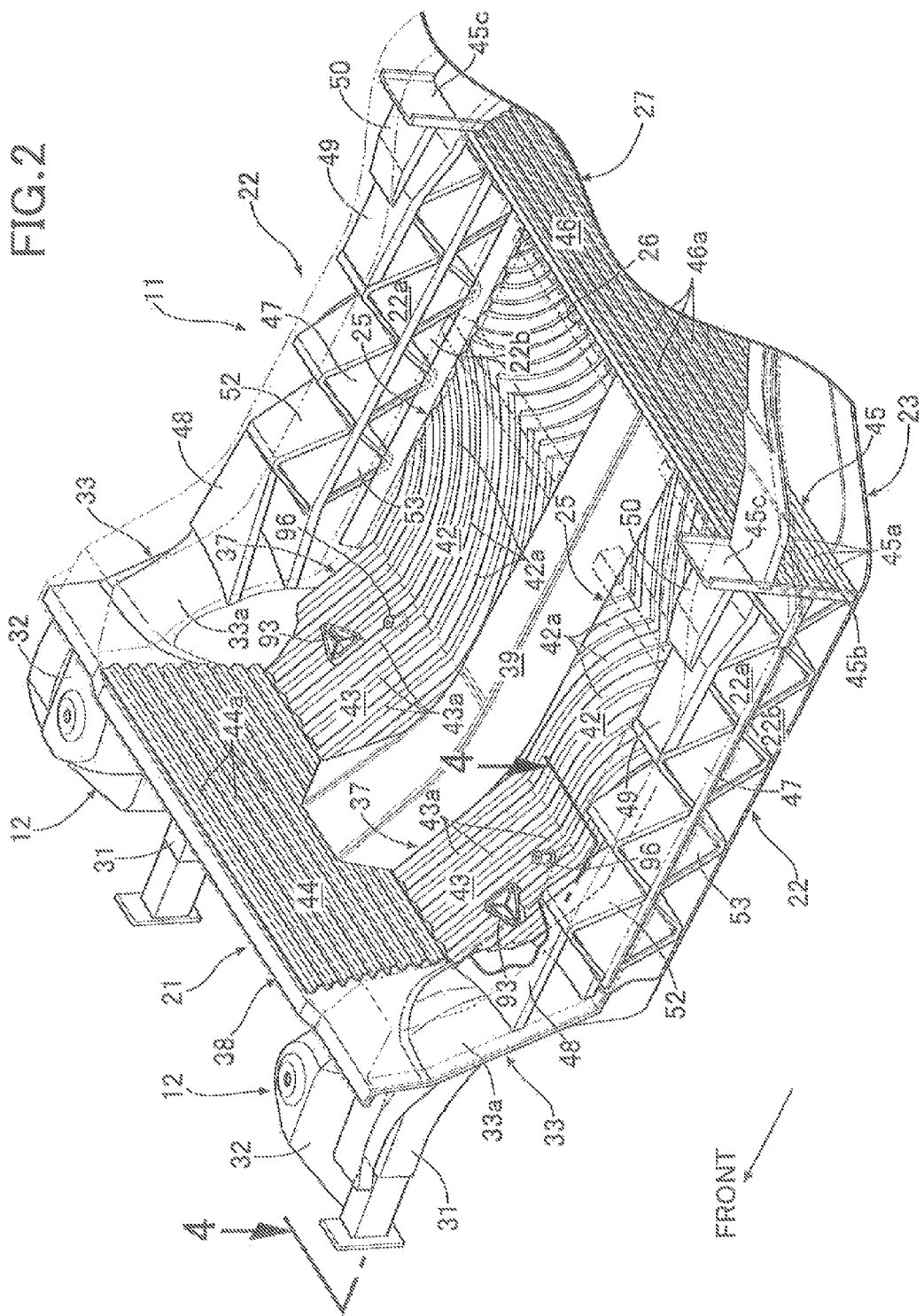
FIG. 2 is a partial perspective view of the cabin with an inner skin removed. (first embodiment)

As shown in FIG. 1 and FIG. 2, the inner skin 19 and the outer skin 20 forming the cabin 11 include joining flanges 19a and 20a extending so as to surround outer peripheries of the dash panel 21, the left and right side sills 22 and 22, the left and right rear side frames 23 and 23, and the rear end cross member 24, the two joining flanges 19a and 20a being joined by adhesion, fusion, riveting, etc.

The front floor panel 25 includes left and right core materials 42 and 42 formed from a corrugated plate and sandwiched between the inner skin 19 and the outer skin 20. The core material 42 sandwiched between the side sill 22 and the floor tunnel 39 is an integrally molded member and includes a plurality of concave-convex portions 42a extending in a ripple shape. An inclined wall 37 of the dash panel 21 includes a corrugated plate-shaped core material 43 sandwiched between the inner skin 19 and the outer skin 20, and concave-convex portions 43a extending in the fore-and-aft direction of the core material 43 are continuous with a tangent to the front end of the concave-convex portions 42a of the core material 42 of the front floor panel 25. Furthermore, a vertical wall 38 of the dash panel 21, a kick-up part 26, and a rear floor panel 27 include corrugated plate-shaped core materials 44, 45, and 46 respectively sandwiched between the inner skin 19 and the outer skin 20, and all concave-convex portions 44a, 45a, and 46a of the core materials 44, 45, and 46 extend in the vehicle width direction.

Figure 3:
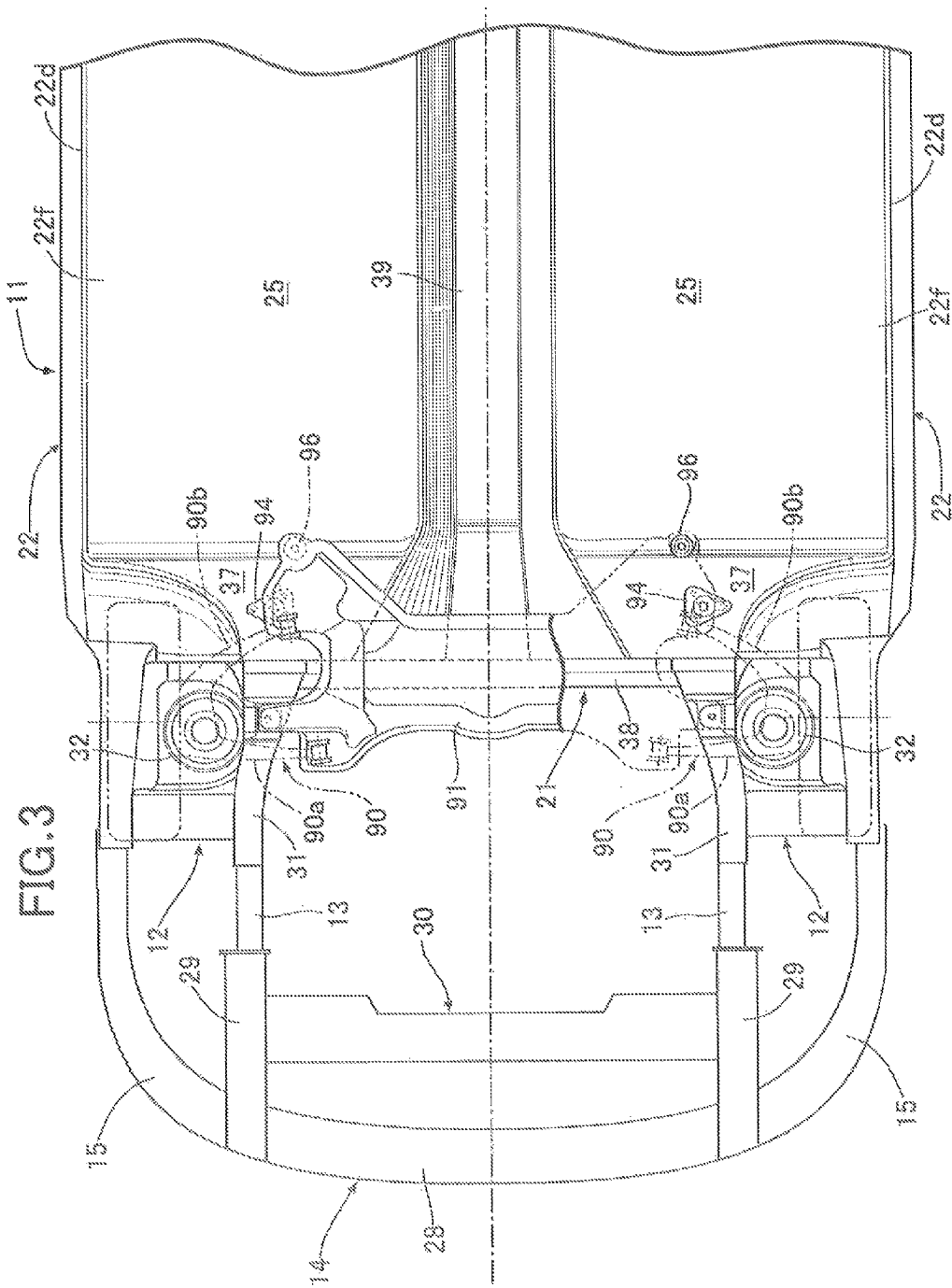
FIG. 3 is a view in the direction of arrow 3 in FIG. 1. (first embodiment)

The side sill 22 is formed as a closed cross-section while having an inner wall 22c, an outer wall 22d, an upper wall 22e, and a lower wall 22f, and the front floor panel 25 is connected to the lower wall 22f (see FIG. 1 and FIG. 3). The interior of the side sill 22 is partitioned into an upper space 22a and a lower space 22b by means of a horizontally disposed front partition member 47 extending in the fore-and-aft direction (see FIG. 2). An upper energy-absorbing member 52 bent in a zig-zag manner is disposed between an upper face of the front partition member 47 and the upper wall 22e of the side sill 22, and a lower energy-absorbing member 53 bent in a zig-zag manner is disposed between a lower face of the front partition member 47 and the lower wall 22f of the side sill 22.

Furthermore, a front linking plate 48 extending forwardly from the upper wall 22e and connected to the wheel house rear wall 33a forming a front wall of the front pillar lower front part 33 is disposed on the front part of the side sill 22, and rear first and second linking plates 49 and 50 extending rearwardly from the upper wall 22e and connected to a front face of a partition wall portion 45b formed by extending the core material 45 of the kick-up part 26 outwardly in the vehicle width direction are disposed on the rear part of the side sill 22.

The front subframe 91 is a plate-shaped member that is long in the vehicle width direction, and is secured to a lower face of the cabin 11 via three positions on each of the left and right. That is, a front part of the front subframe 91 is secured to a lower face of the front side frame rear part 31 of the suspension support module 12 by means of a bolt 92 (see FIG. 5). Furthermore, an intermediate part in the fore-and-aft direction of the front subframe 91 is secured to a lower face of a metal subframe support member 94 by means of a bolt 95, the subframe support member 94 being secured to a lower face of a metal front insert member 93 embedded in the core material 43 of the inclined wall 37 of the dash panel 21 (see FIG. 4 to FIG. 6). Moreover, a rear part of the front subframe 91 is secured to a lower face of a metal rear insert member 96 embedded in the core material 43 of the inclined wall 37 of the dash panel 21 by means of a bolt 97 (see FIG. 4 and FIG. 5).

The rear insert member 96 is a narrow cylindrical member, and is disposed perpendicularly to the front floor panel 25 and obliquely to the inclined wall 37 of the dash panel 21. On the other hand, the front insert member 93 is a thick triangular prism-shaped member, and is disposed perpendicularly to the inclined wall 37 of the dash panel 21.

Figure 4:
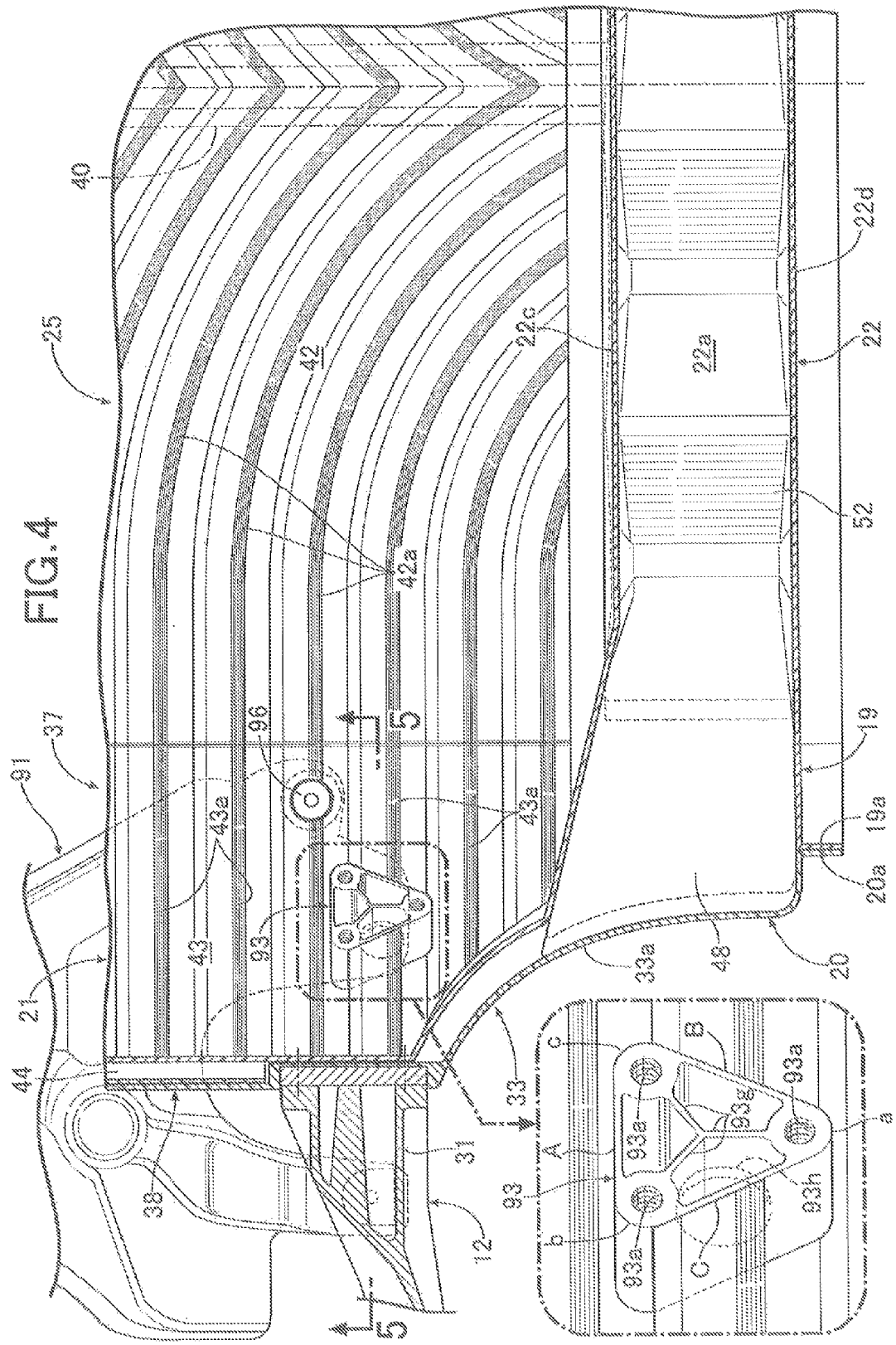
FIG. 4 is a sectional view along line 4-4 in FIG. 2. (first embodiment)
Figure 5:
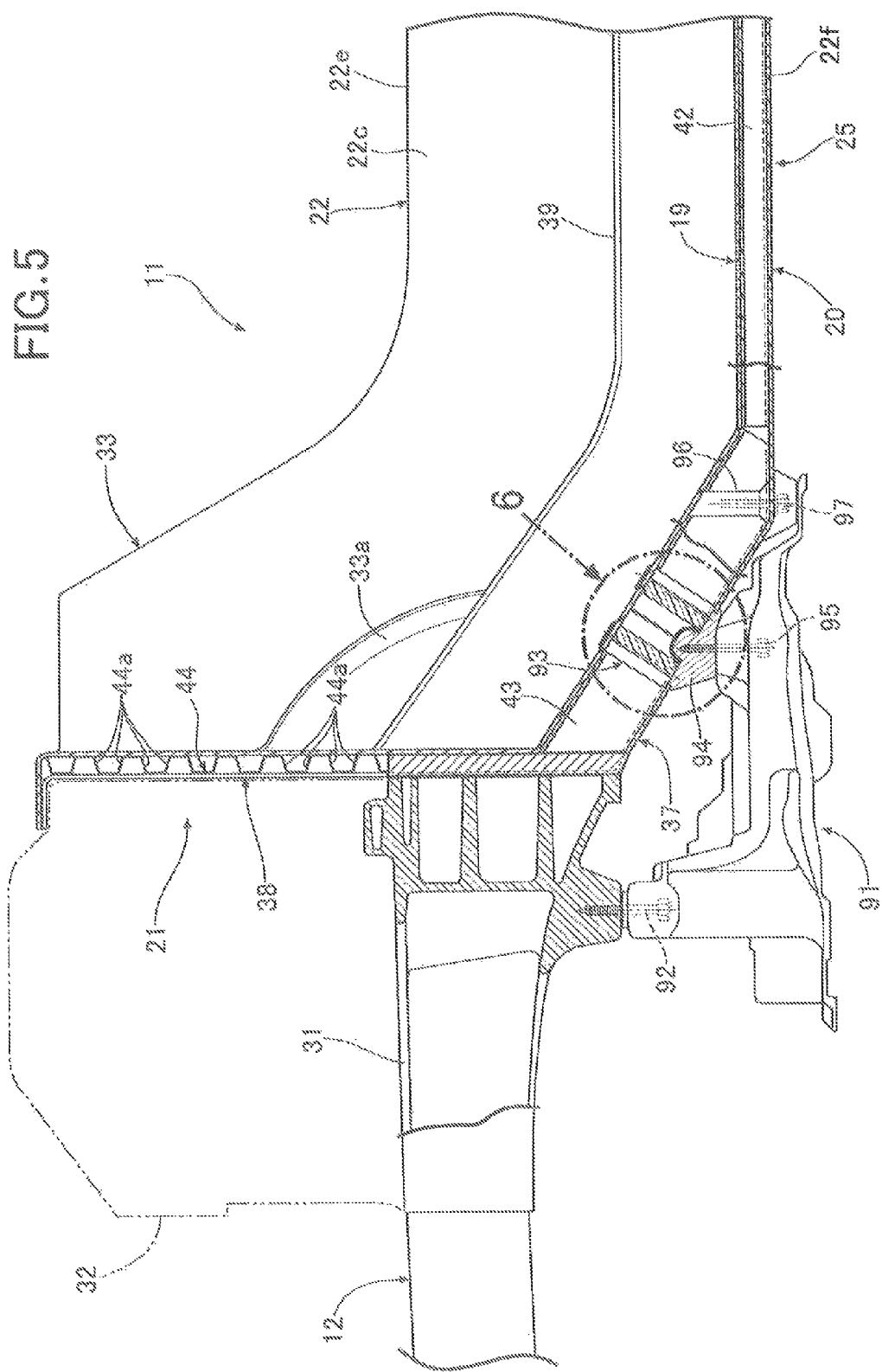
FIG. 5 is a sectional view along line 5-5 in FIG. 4. (first embodiment)
Figure 6:
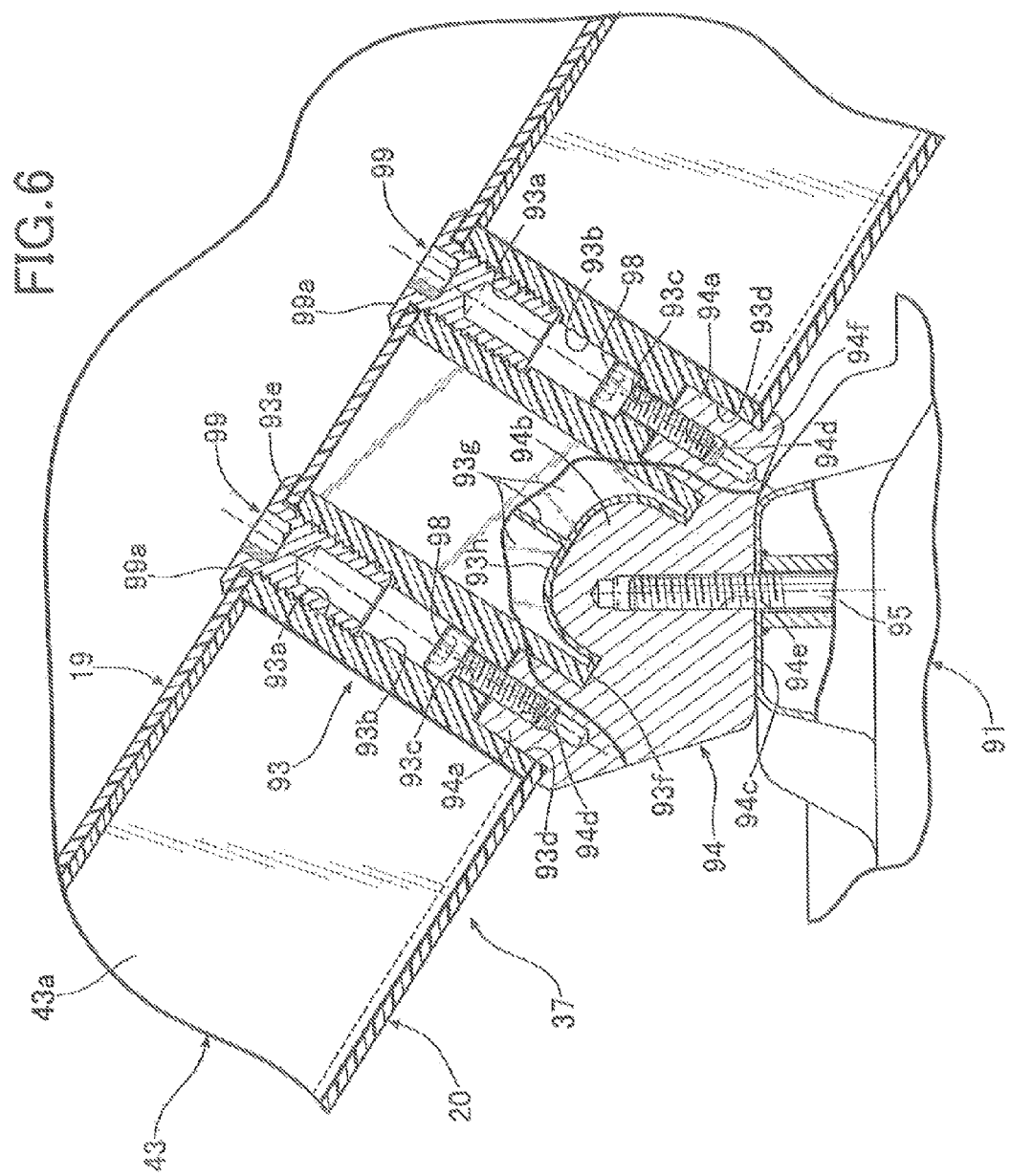
FIG. 6 is an enlarged view of part 6 in FIG. 5. (first embodiment)

The structures of the front insert member 93 and the subframe support member 94 are explained below by reference to FIG. 4 to FIG. 6.

The cross section of the front insert member 93 is an isosceles right triangle with three rounded apexes a, b, and c, and it is embedded in the core material 43 so that its bottom side A is aligned in the fore-and-aft direction, the two apexes b and c and the bottom side A being positioned on the inside in the vehicle width direction, and the apex a and two oblique sides B and C being positioned on the outside in the vehicle width direction. A bolt hole 93a, a large diameter hole 93b, a small diameter hole 93c, and a fitting hole 93d are formed coaxially in the vicinity of the three apexes a, b, and c, which are formed so as to be thick, from an upper face 93e toward a lower face 93f. Furthermore, the interior of the front insert member 93, which is bounded by the three apexes a, b, and c, is hollow, and a Y-shaped rib 93g connecting the three apexes a, b, and c and a spherical wall 93h that is upwardly concave from the lower face 93f are formed therein. In a state in which the front insert member 93 is embedded in the core material 43, the upper face 93e of the front insert member 93 is in contact with a lower face of the inner skin 19, and the lower face 93f of the front insert member 93 is in contact with an upper face of the outer skin 20.

The subframe support member 94 includes three fitting projections 94a fitted into the three fitting holes 93d of the front insert member 93, a bulge portion 94b bulging upwardly from the position bounded by the three fitting projections 94a and fitted into the spherical wall 93h of the front insert member 93, a horizontal securing seat 94c abutting against an upper face of the front subframe 91, bolt holes 94d formed at the center of the fitting projections 94a, and a bolt hole 94e extending from the securing seat 94c to the interior of the bulge portion 94b.

Therefore, in a state in which the subframe support member 94 is moved close to the lower face 93f of the front insert member 93 embedded in the core material 43 of the inclined wall 37 of the dash panel 21, and the three fitting projections 94a and the bulge portion 94b are fitted into the three fitting holes 93d and the spherical wall 93h of the front insert member 93, three first bolts 98 are inserted through the bolt holes 93a, the large diameter holes 93b, and the small diameter holes 93c of the front insert member 93 and screwed into the bolt holes 94d of the subframe support member 94. As a result, the opening edge of the outer skin 20 is sandwiched between the flange portion 94f on the outer periphery of the subframe support member 94 and the lower face 93f of the front insert member 93, and the outer skin 20 and the subframe support member 94 are fixed to the front insert member 93.

Subsequently, by screwing three second bolts 99 into the three bolt holes 93a of the front insert member 93 the opening edge of the inner skin 19 is sandwiched between head portions 99a of the second bolts 99 and the upper face 93e of the front insert member 93, thus fixing the inner skin 19 to the front insert member 93. The front insert member 93 and the subframe support member 94 are thus fixed to the inclined wall 37 of the dash panel 21, and by screwing a bolt 95 extending through the front subframe 91 from bottom to top into a bolt hole 94e opening in the securing seat 94c of the subframe support member 94, the intermediate part in the fore-and-aft direction of the subframe support member 94 is secured to the front subframe 91.

The operation of the first embodiment of the present invention having the above arrangement is now explained.

Since the left and right suspension systems 90 and 90 are provided on the front subframe 91 supported on the front lower part of the cabin 11, it is necessary to strongly fix the front subframe 91 to the cabin 11 so that it can withstand a load inputted from the suspension systems 90 and 90. In particular, when a vehicle is turning at high speed, etc., a large side force inputted from the road surface to a front wheel acts as a large load in the vehicle width direction on the front subframe 91 via the suspension systems 90 and 90. In this arrangement, since the base end of a lower arm 90a on the front side of the suspension system 90 is supported in the vicinity of the position where the front subframe 91 is fixed to the metal front side frame rear part 31 by means of the bolt 92 (see FIG. 3 and FIG. 4), it is possible to ensure a sufficient support strength. On the other hand, since the base end of a lower arm 90b on the rear side of the suspension system 90 is supported in the vicinity of the position where the front subframe 91 is fixed by means of the bolt 95 to the front insert member 93 embedded in the inclined wall 37 of the carbon fiber-reinforced plastic dash panel 21 (see FIG. 3 and FIG. 4), there is a possibility that the support strength might become insufficient.

However, in accordance with the present embodiment, since the inclined wall 37, in which the front insert member 93 is embedded, is formed by sandwiching the core material 43, which is a corrugated plate having a large number of concave-convex portions 43a, between the inner skin 19 and the outer skin 20, the strength with which the front insert member 93 is supported by the inclined wall 37 is enhanced. Moreover, since the front insert member 93, which has a triangular shape when viewed from above, has the apex a oriented toward the outside in the vehicle width direction, and has the two sides B and C sandwiching the apex a abutting against the core material 43 (see FIG. 4), when a load in the vehicle width direction is inputted into the front subframe 91 from the lower arm 90b on the rear side of the suspension system 90 (see FIG. 3), it is possible, by absorbing the load by dispersing it from the two sides B and C sandwiching the apex a of the front insert member 93 toward the core material 43 of the inclined wall 37, to further enhance the strength with which the front subframe 91 is supported by the inclined wall 37 without complicating the structure of the front insert member 93.

Furthermore, since the subframe support member 94 securing the front subframe 91 is secured to the vicinity of the three apexes a, b, and c of the triangular shape of the front insert member 93 by means of the first bolts 98, the bulge portion 94b fitted into the spherical wall 93h of the front insert member 93 is formed on the subframe support member 94, and the bolt hole 94e into which the bolt 95 securing the front subframe 91 to the subframe support member 94 is screwed extends to the interior of the bulge portion 94b (see FIG. 6), it is possible to enhance the tightening force by forming the bolt hole 94e into which the bolt 95 securing the front subframe 91 to the subframe support member 94 is screwed so that it is long while reducing the dimensions of the subframe support member 94 so as to decrease the amount thereof projecting downwardly from the front insert member 93.

Moreover, since, in a state in which the outer skin 20 is sandwiched between the flange 94f of the subframe support member 94 and the lower face 93f of the front insert member 93, the front insert member 93 and the subframe support member 94 are secured by means of the first bolts 98 inserted from the inner skin 19 side into the bolt holes 93a, the large diameter holes 93b, and the small diameter holes 93c, which are securing holes formed in the front insert member 93, and the inner skin 19 is secured to the front insert member 93 by means of the second bolts 99 inserted into the bolt holes 93a from the inner skin 19 side (see FIG. 6), it becomes possible to insert the first bolts 98 and the second bolts 99 into the common securing holes from the inner skin 19 side, thus not only enhancing the workability by enabling the first and second bolts 98, 99 to be operated from the vehicle compartment side, which the inner skin 19 faces, but also simplifying the structure by reducing the number of securing holes. Furthermore, since the securing holes do not open on the outer skin 20 side, it is possible to prevent water, etc. from entering the vehicle compartment side through the securing holes.

Moreover, since the cabin 11 includes the side sills 22 extending rearwardly from opposite sides in the vehicle width direction of the inclined wall 37, and the front end of the front partition member 47 partitioning the interior of the side sill 22 into the upper space 22a and the lower space 22b is positioned in the vicinity of the front insert member 93, it is possible to support a load inputted from the front insert member 93 into the inclined wall 37 by efficiently dispersing it to the side sill 22 via the front partition member 47.

Furthermore, since the front floor panel 25 connected to the rear of the inclined wall 37 is formed by sandwiching the core material 42, which is a corrugated plate having a large number of concave-convex portions 42a extending in the fore-and-aft direction, between the inner skin 19 and the outer skin 20, and the concave-convex portions 43a of the core material 43 of the inclined wall 37 are continuous with the concave-convex portions 42a of the core material 42 of the front floor panel 24 (see FIG. 4), it is possible to support a load inputted from the front insert member 93 into the core material 43 of the inclined wall 37 by efficiently dispersing it to the core material 42 of the front floor panel 25.

Second Embodiment

A second embodiment of the present invention is explained below by reference to FIG. 7 to FIG. 12.

The front floor panel 25 includes left and right core materials 42 and 42 formed from a corrugated plate and sandwiched between the inner skin 19 and the outer skin 20. The core material 42 sandwiched between the side sill 22 and the floor tunnel 39 is an integrally formed member, but is sectioned into a first section A in front of the front cross member 40, a second section B in front of the first section A, a third section C to the rear of the front cross member 40, and a fourth section D to the rear of the third section C (see FIG. 7 and FIG. 10).

The first section A includes a plurality of concave-convex portions 42a extending as concentric ripple shapes with a front portion of the side sill 22 along a concentric circle CC1 with a center O1, the outer end in the vehicle width direction of the concave-convex portions 42a being connected to the side sill 22, and the rear end of the concave-convex portions 42a being connected to the front cross member 40. The boundary line between the first section A and the second section B passes through the center O1, and the core material 42 of the second section B includes concave-convex portions 42b connected tangentially to the concave-convex portions 42a of the core material 42 of the first section A and extending in the fore-and-aft direction (see FIG. 9).

Furthermore, the third section C includes a plurality of concave-convex portions 42c extending as concentric ripple shapes with a rear portion of the side sill 22 along a concentric circle CC2 with a center O2, the outer end in the vehicle width direction of the concave-convex portions 42c being connected to the side sill 22, and the front end of the concave-convex portions 42c being connected to the front cross member 40. The boundary line between the third section C and the fourth section D passes through the center O2, and the core material 42 of the fourth section B includes concave-convex portions 42d connected tangentially to the concave-convex portions 42c of the core material 42 of the third section C and extending in the fore-and-aft direction.

The inclined wall 37 of the dash panel 21 includes a corrugated core material 43 sandwiched between the inner skin 19 and the outer skin 20, and the vertical wall 38 of the dash panel 21 includes a corrugated core material 44 sandwiched between the inner skin 19 and the outer skin 20. The core material 43 of the inclined wall 37 includes concave-convex portions 43a extending in the fore-and-aft direction, and the concave-convex portions 43a are continuous with the concave-convex portions 42b of the second section B of the core material 42 of the front floor panel 25 (see FIG. 7). On the other hand, the core material 44 of the vertical wall 38 includes concave-convex portions 44a extending in the vehicle width direction, the concave-convex portions 43a of the core material 43 of the inclined wall 37 being perpendicular to the concave-convex portions 44a of the core material 44 of the vertical wall 38 (see FIG. 2).

The kick-up part 26 and the rear floor panel 27 respectively include corrugated core materials 45 and 46 sandwiched between the inner skin 19 and the outer skin 20, concave-convex portions 45a, 46a of the core materials 45 and 46 all extending in the vehicle width direction. Therefore, the concave-convex portions 42d of the fourth section D of the core material 42 of the front floor panel 25 are perpendicular to the concave-convex portions 45a of the core material 45 of the kick-up part 26 (see FIG. 7).

Figure 8:
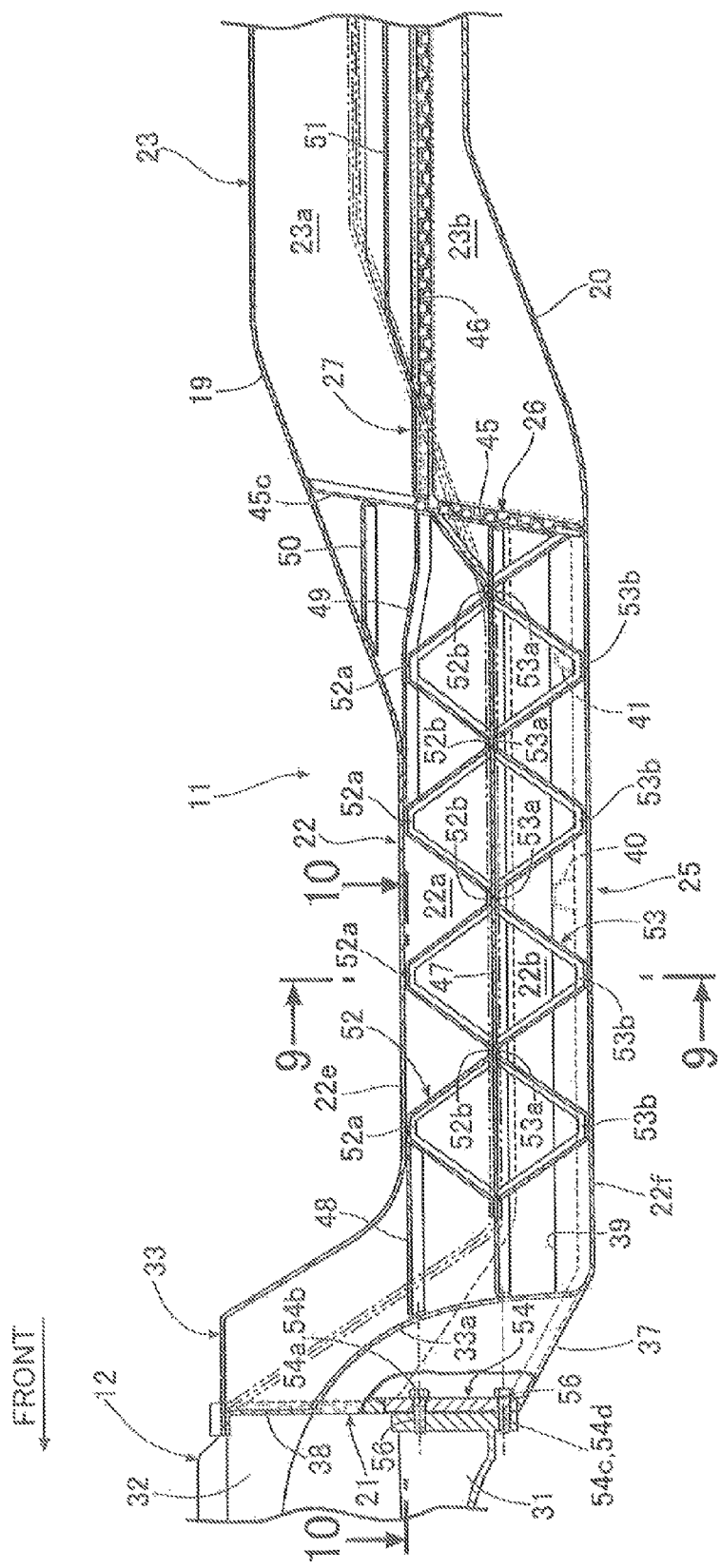
FIG. 8 is a sectional view along line 8-8 in FIG. 7. (second embodiment)
Figure 9:
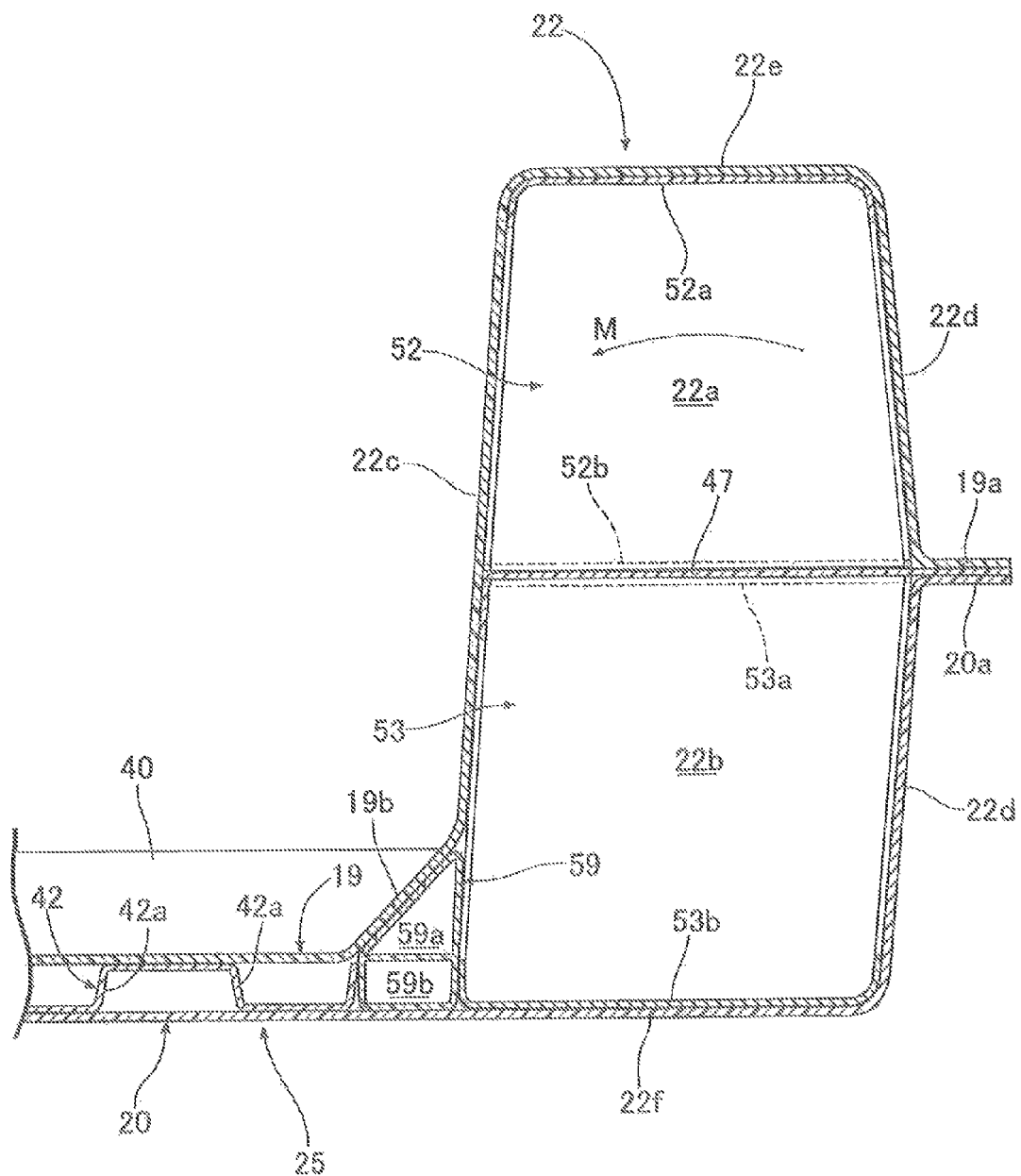
FIG. 9 is a sectional view along line 9-9 in FIG. 8. (second embodiment)

The side sill 22 is formed as a closed cross-section while having an inner wall 22c, an outer wall 22d, an upper wall 22e, and a lower wall 22f, and the front floor panel 25 is connected to the lower wall 22f (see FIG. 9). The interior of the side sill 22 is partitioned into an upper space 22a and a lower space 22b by means of a horizontally disposed front partition member 47 extending in the fore-and-aft direction (see FIG. 9). The outer end in the vehicle width direction of the front partition member 47 is sandwiched between the flange portions 19a and 20a of the inner skin 19 and outer skin 20, the inner end in the vehicle width direction is connected to the inner skin 19 forming the inner wall 22c of the side sill 22, and the front end is connected to a rear face of a wheel house rear wall 33a forming a front wall of the front pillar lower front part 33 (see FIG. 8).

Figure 11:
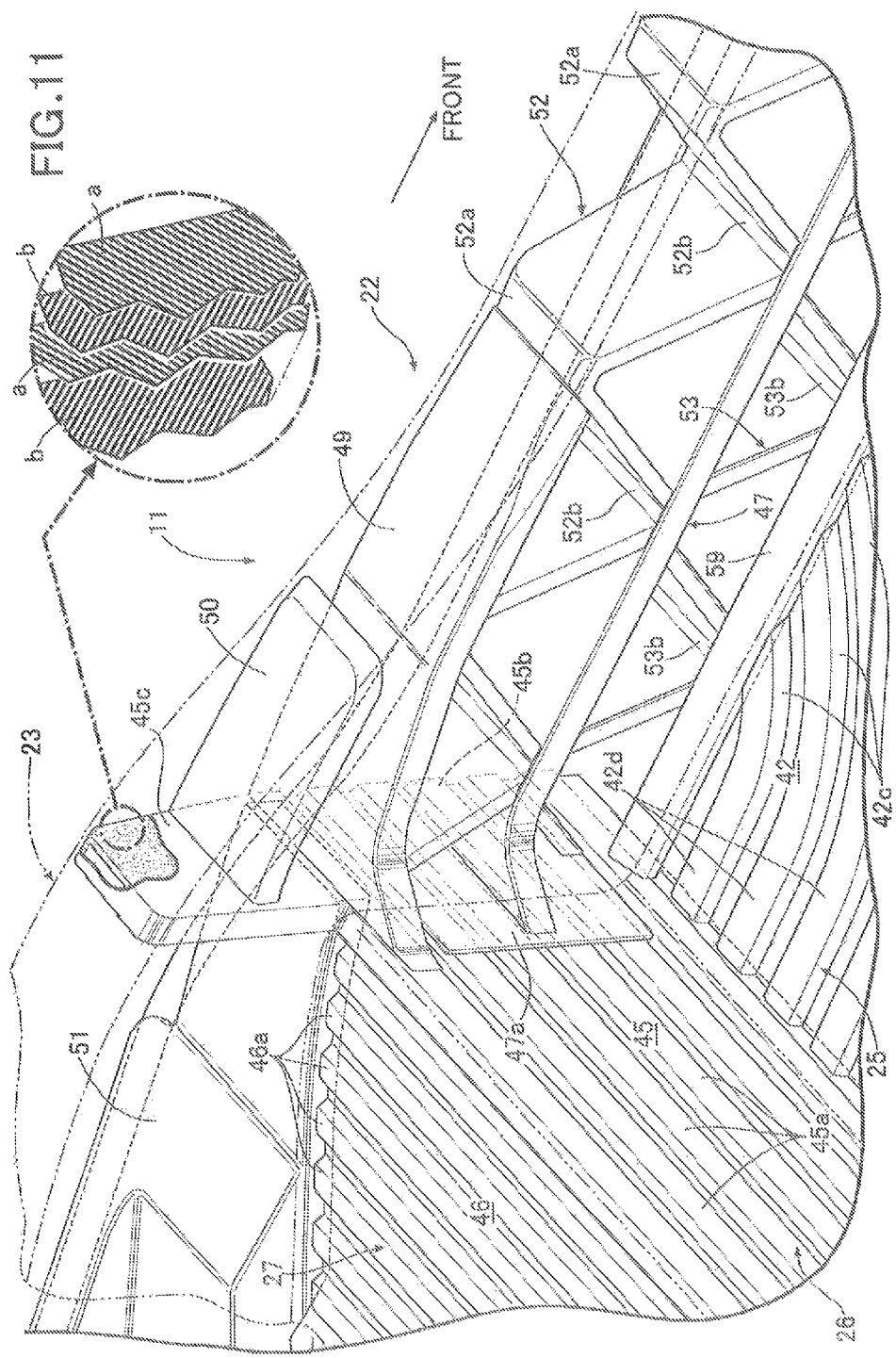
FIG. 11 is a view in the direction of arrow 11 in FIG. 7. (second embodiment)

Furthermore, partition wall portions 45b and 45b projecting from opposite ends in the vehicle width direction of the core material 45 of the kick-up part 26 are connected to the outer wall 22d, the upper wall 22e, and the lower wall 22f of the side sill 22 in a state in which they are each fitted into the interior of the side sill 22, and a flange 47a, extending in the vehicle width direction, provided at the rear end of the front partition member 47 is connected to a front face of the partition wall portion 45b of the core material 45 in the interior of the side sill 22 (see FIG. 11).

Figure 10:
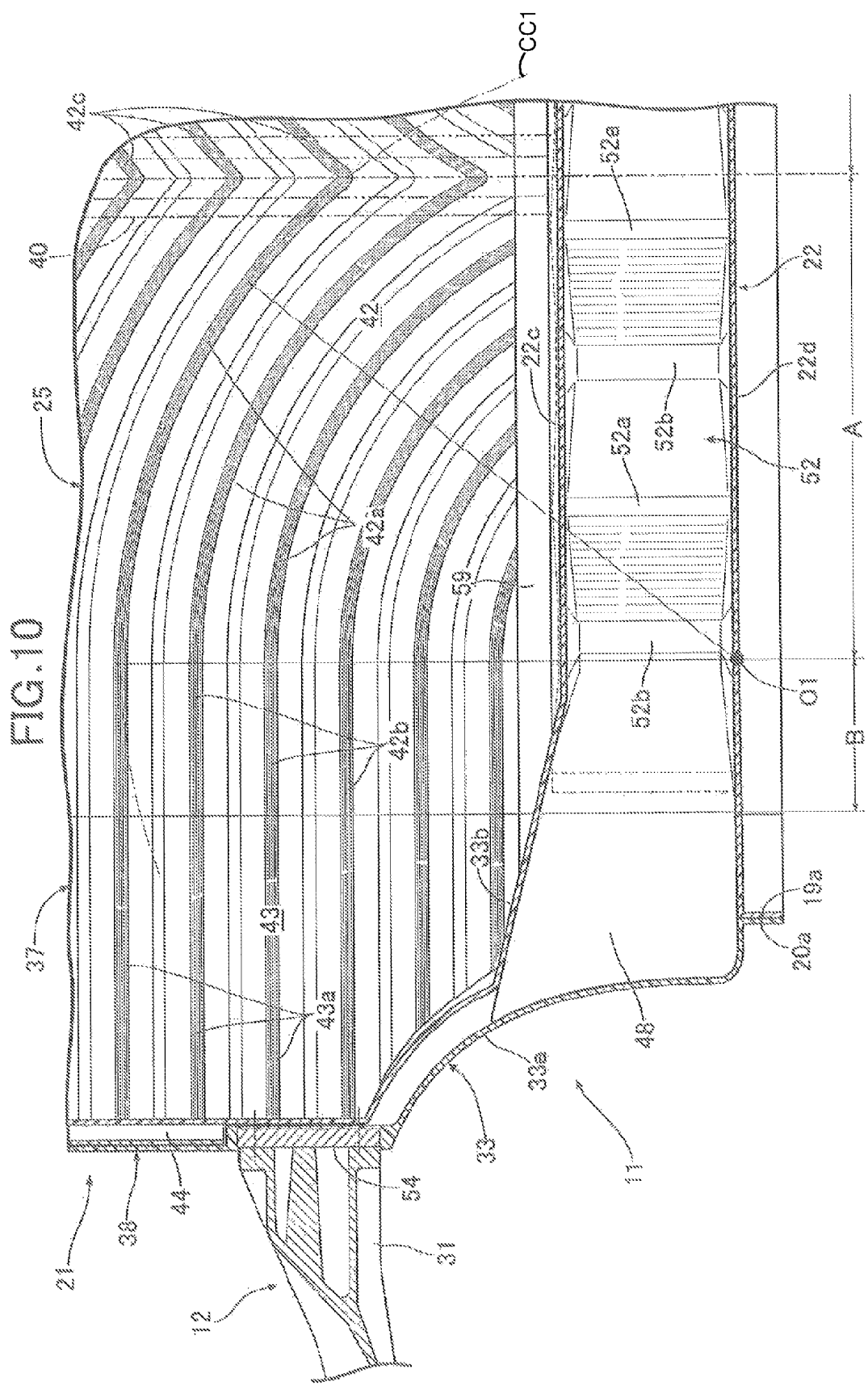
FIG. 10 is a sectional view along line 10-10 in FIG. 8. (second embodiment)

A front linking plate 48 extending in the horizontal direction is disposed in the upper space 22a in a front part of the side sill 22 (see FIG. 8 and FIG. 10). Left and right edges of the front linking plate 48 are connected to the inner wall 22c and the outer wall 22d of the side sill 22, the rear end is connected to a lower face of the upper wall 22e of the side sill 22, and the front end is connected to a rear face of the wheel house rear wall 33a forming a front wall of the front pillar lower front part 33. The width in the vehicle width direction of the front linking plate 48 widens on the inside in the vehicle width direction in going from the rear end toward the front end, and accompanying this, an inner wall 33b in the vehicle width direction of the front pillar lower front part 33 also widens on the inside in the vehicle width direction in going toward the front (see FIG. 10).

A rear first linking plate 49 extending in the horizontal direction is disposed in the upper space 22a in a rear part of the side sill 22 (see FIG. 8 and FIG. 11). Left and right edges of the rear first linking plate 49 are connected to the inner wall 22c and the outer wall 22d of the side sill 22, the front end is connected to the lower face of the upper wall 22e of the side sill 22, and the rear end is connected to a front face of a portion, fitted into the side sill 22, of the partition wall portion 45b of the core material 45 of the kick-up part 26. A rear second linking plate 50 extending in the horizontal direction is disposed above the rear first linking plate 49. The rear second linking plate 50 is formed so as to have a length in the fore-and-aft direction that is shorter than that of the rear first linking plate 49, left and right edges are connected to the inner wall 22c and the outer wall 22d of the side sill 22, the front end is connected to the lower face of the upper wall 22e of the side sill 22, and the rear end is connected to a front face of a flat portion 45c projecting upwardly from the upper end of the partition wall portion 45b of the core material 45 of the kick-up part 26.

The flat portion 45c of the core material 45, to which the rear end of the rear second linking plate 50 is connected, is formed not into a corrugated plate but a flat plate, and with regard to the direction of orientation of carbon sheets forming the flat portion 45c, as shown enlarged in a circle in FIG. 11, carbon sheets a in which carbon fibers are inclined downwardly through 45° from the outside toward the inside in the vehicle width direction and carbon sheets b in which carbon fibers are inclined upwardly through 45° from the outside toward the inside in the vehicle width direction are layered in turn.

Figure 7:
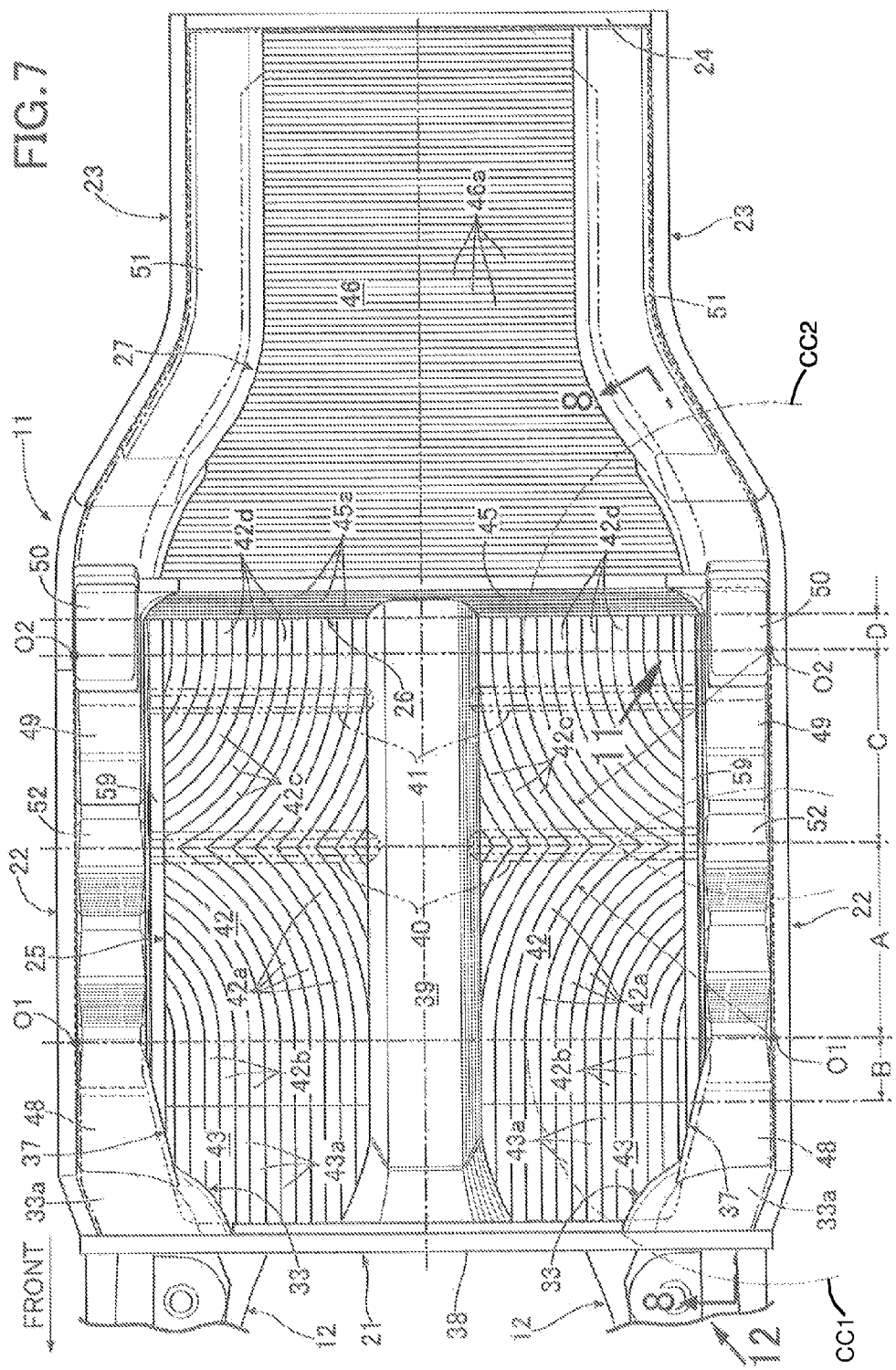
FIG. 7 is a view in the direction of arrow 7 in FIG. 1. (second embodiment)

The interior of the rear side frame 23 extending upwardly to the rear from the rear end of the side sill 22 is partitioned into an upper space 23a and a lower space 23b by means of a rear partition member 51 extending in the fore-and-aft direction (see FIG. 7, FIG. 8 and FIG. 11). The front end of the rear partition member 51 is connected to the rear end of the rear first linking plate 49 of the side sill 22 with the core material 45 of the kick-up part 26 sandwiched therebetween.

An upper energy-absorbing member 52 is disposed in the upper space 22a of the side sill 22, and a lower energy-absorbing member 53 is disposed in the lower space 22b of the side sill 22 (see FIG. 8 and FIG. 11). The upper energy-absorbing member 52 is formed from a plate material bent in a zig-zag manner, peak portions 52a at the upper end and valley portions 52b at the lower end alternating consecutively. Similarly, the lower energy-absorbing member 53 is formed from a plate material bent in a zig-zag manner, peak portions 53a at the upper end and valley portions 53b at the lower end alternating consecutively.

Left and right edges of the upper energy-absorbing member 52 and the lower energy-absorbing member 53 are connected to the inner wall 22c and the outer wall 22d of the side sill 22, the peak portions 52a of the upper energy-absorbing member 52 are connected to the lower face of the upper wall 22d of the side sill 22 and a lower face of the rear first linking plate 49, and the valley portions 53b of the lower energy-absorbing member 53 are connected to the lower wall 22f of the side sill 22. The plate thickness of the upper energy-absorbing member 52 is set so as to be smaller than the plate thickness of the lower energy-absorbing member 53. The valley portions 52b of the upper energy-absorbing member 52 and the peak portions 53a of the lower energy-absorbing member 53 are connected to the upper face and the lower face respectively of the front partition member 47, and in this arrangement the valley portions 52b and the peak portions 53a are connected so as to oppose each other with the front partition member 47 sandwiched therebetween.

Figure 12:
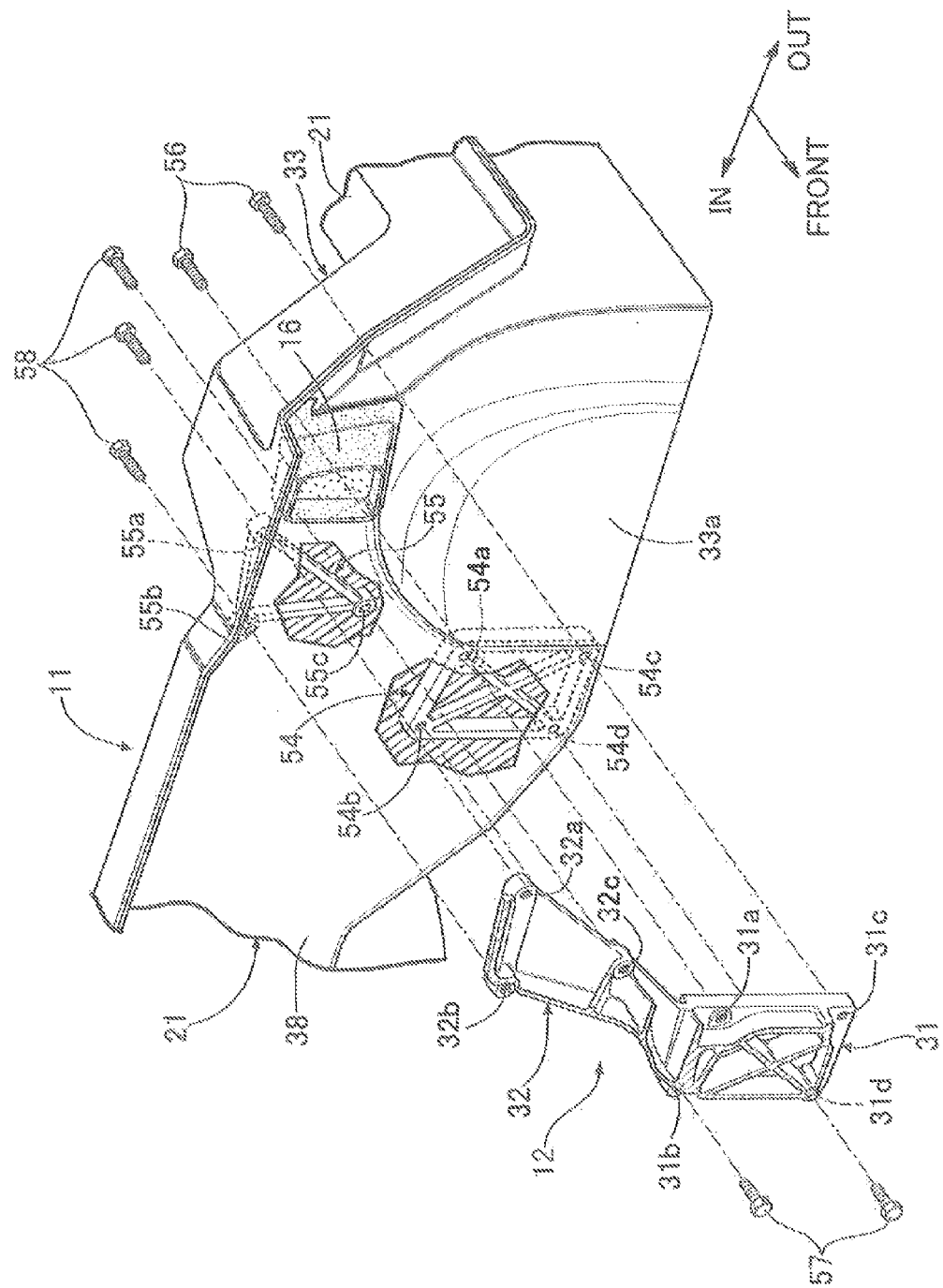
FIG. 12 is a view in the direction of arrow 12 in FIG. 7. (second embodiment)

First and second reinforcing members 54 and 55, both formed from an aluminum extrusion, are inserted in advance into an end part in the vehicle width direction of the vertical wall 38 of the dash panel 21 (see FIG. 12). The first reinforcing member 54 is a rectangular flat member, and two bolt holes 54a and 54c and two female threaded holes 54b and 54d are formed in corners thereof. The second reinforcing member 55 is a triangular shaped flat member, and three bolt holes 55a to 55c are formed in corners thereof. On the other hand, two female threaded holes 31a and 31c and two bolt holes 31b and 31d are formed in the rear end of the front side frame rear part 31 of the suspension support module 12, and three female threaded holes 32a to 32c are formed in the rear end of the damper housing 32 of the suspension support module 12.

The suspension support module 12 is secured to the front face of the dash panel 21 by screwing two bolts 56 and 56 extending through the two bolt holes 54a and 54c of the first reinforcing member 54 from the front to the rear into the two female threaded holes 31a and 31c of the front side frame rear part 31, screwing two bolts 57 and 57 extending through the two bolt holes 31b and 31d of the front side frame rear part 31 from the rear to the front into the female threaded hole 54b and 54d of the first reinforcing member 54, and screwing three bolts 58 extending through the three bolt holes 55a to 55c of the second reinforcing member 55 from the rear to the front into the three female threaded holes 32a to 32c of the damper housing 32.

In this arrangement, among the two bolt holes 54a and 54c and the two female threaded holes 54b and 54d of the first reinforcing member 54, the heights of the bolt hole 54a and the female threaded hole 54b on the upper side, are substantially coincident with the height of the front linking plate 48 of the side sill 22, and the heights of the bolt hole 54c and the female threaded hole 54d on the lower side are substantially coincident with the height of the front partition member 47 of the side sill 22 (see FIG. 8).

An inclined face 19b is formed in a portion of the inner skin 19, forming the upper face of the front floor panel 25, that rises upwardly and is connected to the inner wall 22c of the side sill 22 (see FIG. 9). The inclined face 19b is inclined so that its height increases gradually from the inside to the outside in the vehicle width direction, and a frame member 59 having a fixed cross section formed from a drawn carbon fiber-reinforced plastic or an aluminum alloy extrusion is disposed between a lower face of the inclined face 19b and the upper face of the outer skin 20 (see FIG. 9 to FIG. 11). The frame member 59 integrally includes a triangular cross section portion 59a on the upper side and a rectangular cross section portion 59b on the lower side, an inclined side of the triangular cross section portion 59a is adhered to the lower face of the inclined face 19b of the inner skin 19, and the bottom side of the rectangular cross section portion 59b is adhered to the upper face of the outer skin 20. The inclined face 19b and the frame member 59 reinforce a section where the front floor panel 25 and the side sill 22 are connected.

The operation of the second embodiment of the present invention having the above arrangement is now explained.

Since the side sill 22 of the cabin 11 rises upwardly from the front floor panel 25, when the side sill 22 is involved in a side collision with another vehicle, a bending moment M (see FIG. 9) that works so as to collapse the side sill 22 inwardly in the vehicle width direction is generated by means of the collision load. In particular, when a side collision with a vehicle having a high bumper position such as an SUV occurs, since the collision load is inputted into a high position of the side sill 22, the bending moment M is large. However, in accordance with the present embodiment, the inner skin 19 positioned on the boundary between the inner wall 22c of the side sill 22 and the upper wall of the front floor panel 25 includes the inclined face 19b, which is inclined so that the outside in the vehicle width direction is high, and it is therefore possible to transmit the bending moment M, which works so as to collapse the side sill 22 inwardly in the vehicle width direction, to the front floor panel 25 via the inclined face 19b and support it, thus preventing the side sill 22 from collapsing without increasing the number of cross members of the front floor panel 25 or increasing the height of a cross member.

In this arrangement, since the inclined face 19b of the inner skin 19 and the outer skin 20 are connected via the frame member 59 extending in the fore-and-aft direction, it is possible to further reliably prevent the side sill 22 from collapsing by suppressing deformation of the inclined face 19b and transmitting the bending moment M to the outer skin 20 via the frame member 59. Moreover, since the frame member 59 is a tubular hollow member, the frame member 59 can be easily produced by extrusion molding or draw molding.

Furthermore, when the collision load of a side collision is inputted into the side sill 22, if the collision load is transmitted to the floor tunnel 39 via the front floor panel 25 without being dispersed in the fore-and-aft direction, there is a possibility that the floor tunnel 39, which is relatively brittle, will crumple and the side sill 22 will enter the vehicle compartment to thus reduce the vehicle compartment space. However, in accordance with the present embodiment, since the core material 42 sandwiched between the inner skin 19 and the outer skin 20 of the front floor panel 25 includes the concave-convex portions 42a extending in a ripple shape forwardly and inwardly in the vehicle width direction in the first section A in front of the front cross member 40, and the concave-convex portions 42c extending in a ripple shape rearwardly and inwardly in the vehicle width direction in the third section C to the rear of the front cross member 40 (see FIG. 7), the collision load of a side collision inputted into an intermediate part in the fore-and-aft direction of the side sill 22 is dispersed forwardly from the side sill 22 and the front cross member 40 via the concave-convex portions 42a, which curve smoothly, of the core material 42 of the first section A, is also dispersed rearwardly from the side sill 22 and the front cross member 40 via the concave-convex portions 42c, which curve smoothly, of the core material 42 of the third section C, and is efficiently absorbed, thereby preventing the floor tunnel 39 from crumpling and preventing the side sill 22 from moving inwardly in the vehicle width direction.

Furthermore, since the core material 42 is made of a fiber-reinforced plastic, compared with a case in which it is produced by press forming a metal plate, the concave-convex portions 42a, 42c can be formed so as to be deep and, moreover, since the core material 42 is sandwiched between the inner skin 19 and the outer skin 20 and the strength of the front floor panel 25 is enhanced, transmission of the collision load can be carried out efficiently. In particular, since the concave-convex portions 42a, 42c extend not only from the side sill 22 but also from the front cross member 40, it is possible to reliably transmit, to the concave-convex portions 42a, 42c, a collision load that has been transmitted from the side sill 22 to the front cross member 40.

Furthermore, since the core material 42 of the second section B in front of the first section A includes the concave-convex portions 42b extending forwardly and linearly from an end part of the concave-convex portions 42a with the ripple shape of the first section A, even if the dimension in the fore-and-aft direction of the core material 42 in front of the front cross member 40 is large, a collision load that has been dispersed forwardly can be transmitted to the dash panel 21 via the concave-convex portions 42b of the second section B; similarly, since the core material 42 of the fourth section D to the rear of the third section C includes the concave-convex portions 42d, which extend rearwardly and linearly from an end part of the concave-convex portions 42c with the ripple shape of the third section C, even if the dimension in the fore-and-aft direction of the core material 42 to the rear of the front cross member 40 is large, a collision load that has been dispersed rearwardly can be transmitted to the kick-up part 26 via the concave-convex portions 42d of the fourth section D.

Moreover, since the dash panel 21 includes the inclined wall 37, which extends on an incline obliquely upwardly from the front end of the front floor panel 25, and the vertical wall 38, which extends upwardly from the front end of the inclined wall 37, and the concave-convex portions 43a, extending linearly in the fore-and-aft direction, of the core material 43 sandwiched between the inner skin 19 and the outer skin 20 of the inclined wall 37 are connected to the concave-convex portions 42b, extending linearly in the fore-and-aft direction, of the core material 42 of the second section B of the front floor panel 25 (see FIG. 7), it is possible, by reliably transmitting and dispersing the collision load of a side collision, that has been dispersed forwardly, from the core material 42 of the second section B to the core material 43 of the inclined wall 37 of the dash panel 21, to reliably support a collision load that has been dispersed forwardly by means of the inclined wall 37 of the dash panel 21 even when the vertical wall 38 of the dash panel 21 is formed so as to be thin.

Furthermore, since the side sill 22 is partitioned into the upper space 22a and the lower space 22b by means of the front partition member 47, and the front end and the rear end of the front partition member 47 are connected to the dash panel 21 and the kick-up part 26 respectively, it is possible to reinforce the side sill 22 by means of the front partition member 47 and to disperse and absorb, between the dash panel 21 and the kick-up part 26, the collision load of a side collision inputted into the side sill 22. In particular, when a normal vehicle is involved in a side collision, since the collision load is inputted at the height of the front partition member 47 of the side sill 22, it is possible as a result of the effect of reinforcement by the front partition member 47 to prevent the cross section of the side sill 22 from collapsing.

Moreover, since the inner wall 33b in the vehicle width direction of the front pillar lower front part 33 connected to the front of the side sill 22 widens on the inside in the vehicle width direction with respect to the inner wall 22c in the vehicle width direction of the side sill 22 (see FIG. 10), when the load of a side collision inputted into the side sill 22 is transmitted to the front pillar lower front part 33, it is possible by means of the front pillar lower front part 33, whose strength has increased, to prevent further effectively the side sill 22 from collapsing.

When a vehicle is involved with a side collision with a pole, etc., compared with a case in which it is involved with a side collision with a bumper beam of another vehicle, there is a possibility that a large load will be inputted locally into the side sill 22. In such a case, since the upper energy-absorbing member 52 is disposed within the upper space 22a of the side sill 22, and the lower energy-absorbing member 53 is disposed within the lower space 22b of the side sill 22, it is possible to absorb the collision energy by crumpling of the upper energy-absorbing member 52 and the lower energy-absorbing member 53 in addition to the front partition member 47, thus enabling protection of the vehicle compartment to be carried out.

When there is a side collision with a pole, etc. and the collision load is inputted over a wide range from the lower end to the upper end of the side sill 22, if a large collision load is applied to the upper end of the side sill 22, which is a long distance above the front floor panel 25, the bending moment M that works to collapse the side sill 22 will increase, but since the strength of the upper energy-absorbing member 52 is set so as to be smaller than the strength of the lower energy-absorbing member 53, the upper energy-absorbing member 52, which is normally difficult to crumple, and the lower energy-absorbing member 53, which is normally easy to crumple, are evenly crumpled to thus decrease the moment M, and a maximum energy-absorbing effect can be exhibited while minimizing collapsing of the side sill 22 inwardly in the vehicle width direction.

Furthermore, when the vehicle body is viewed from the side, since the upper energy-absorbing member 52 and the lower energy-absorbing member 53 have the peak portions 52*a*, 53*a* and the valley portions 52*b*, 53*b* in a continuous zig-zag shape, and the valley portions 52*b* of the upper energy-absorbing member 52 and the peak portions 53*a* of the lower energy-absorbing member 53 oppose each other with the front partition member 47 sandwiched therebetween (see FIG. 8), the valley portions 52*b* and the peak portions 53*a* are strongly integrated via the front partition member 47, the upper energy-absorbing member 52, the lower energy-absorbing member 53, and the front partition member 47 thus forming a large number of strong triangular shapes. This enables the energy-absorbing effect to be enhanced by reliably crumpling the upper energy-absorbing member 52, the lower energy-absorbing member 53, and the front partition member 47 when a concentrated collision load is inputted into the side sill 22 as a result of collision with a pole, etc.

Moreover, since the dash panel 21 includes the wheel house rear wall 33*a* extending while curving rearwardly to the front end of the side sill 22 from the vicinity of the first reinforcing member 54 having the lower part of the suspension support module 12 secured thereto (see FIG. 8), and the upper wall 22*e* of the side sill 22 and the wheel house rear wall 33*e* are connected by means of the front linking plate 48 extending in a substantially horizontal direction, a collision load inputted from a tire into the wheel house rear wall 33*a*, particularly when involved in a narrow offset frontal collision, can be efficiently transmitted to the upper wall 22*e* of the side sill 22 via the front linking plate 48 and supported, thereby preventing the dash panel 21 from collapsing rearwardly and enabling the vehicle compartment space to be maintained. Moreover, since the interior of the side sill 22 is partitioned into the upper space 22*a* and the lower space 22*b* by means of the front partition member 47 extending in a substantially horizontal direction, and the front end of the front partition member 47 is connected to the wheel house rear wall 33*a*, it is possible to efficiently transmit the collision load of a frontal collision inputted into the wheel house rear wall 33*a* to the side sill 22 from the wheel house rear wall 33*a* via the front partition member 47 and support it.

Furthermore, since the width in the left-and-right direction of the front linking plate 48 increases inwardly in the vehicle width direction from the side sill 22 side as it approaches the first reinforcing member 54 in going toward the wheel house rear wall 33*a* side (see FIG. 10), it is possible to further efficiently transmit the collision load of a frontal collision inputted into the dash panel 21 from the wheel house rear wall 33*a* to the side sill 22. Moreover, it is possible, by integrally joining the inner face of the side sill 22 and the front partition member 47 by means of the upper energy-absorbing member 52 and the lower energy-absorbing member 53 to thus enhance the bending stiffness, to further reliably support the collision load of a frontal collision.

In particular, since the height of the front linking plate 48 is made to substantially coincide with the height of the bolt hole 54*a* and the female threaded hole 54*b*, which are the upper fastening parts of the first reinforcing member 54, and the height of the front partition member 47 is made to substantially coincide with the height of the bolt hole 54*c* and the female threaded hole 54*d*, which are the lower fastening parts of the first reinforcing member 54 (see FIG. 8), it is possible to further efficiently transmit, from the wheel house rear wall 33*a* to the side sill 22 via the front linking plate 48 and the front partition member 47, the collision load of a frontal collision inputted into the first reinforcing member 54 from the front side frame rear part 31 of the suspension support module 12.

Furthermore, since the front end of the rear floor panel 27 and the upper wall 22*e* of the side sill 22 are linked by the rear first linking plate 49 disposed within the rear part of the side sill 22 and extending in a substantially horizontal direction (see FIG. 11), it is possible, by enhancing the strength of the rear part of the side sill 22 rising upwardly to the rear by means of the rear first linking plate 49, to prevent the rear part of the side sill 22 from crumpling due to a collision load even when the rear part of the side sill 22 is involved in a side collision with a vehicle having a large vehicle height such as an SUV, as well as to efficiently transmit the collision load to the rear side frame 23 and the rear floor panel 27, thereby preventing the side sill 22 from collapsing inwardly in the vehicle width direction.

Moreover, since the interior of the rear side frame 23 is partitioned into the upper space 23*a* and the lower space 23*b* by means of the rear partition member 51, and the front end of the rear partition member 51 is linked to the rear end of the rear first linking plate 49, not only is it possible by means of the rear partition member 51 to prevent the rear side frame 23 from being crumpled by the collision load of a side collision, but it is also possible to further efficiently disperse, from the rear side frame 23 to the rear floor panel 27, the collision load of a side collision inputted into the side sill 22.

Furthermore, since the rear second linking plate 50 extending in a substantially horizontal direction above the rear first linking plate 49 is disposed within the rear part of the side sill 22, it is possible, by cooperation of the rear first linking plate 49 and the rear second linking plate 50, to further reliably prevent the rear part of the side sill 22 from crumpling when a collision load is inputted into the rear part of the side sill 22.

Moreover, since the core material 45 having the concave-convex portions 45*a* extending in the vehicle width direction is disposed the interior of the kick-up part 26 rising from the rear end of the front floor panel 25 toward the front end of the rear floor panel 27, the flat portion 45*c* of the partition wall portion 45*b* formed by extending the opposite ends in the vehicle width direction of the core material 45 of the kick-up part 26 is inserted into the interior of the side sill 22, and the rear end of the rear first linking plate 49 is connected to the flat portion 45*c* (see FIG. 11), when the collision load of a side collision is inputted into the rear part of the side sill 22, it is possible by means of the partition wall portion 45*b* formed by extending the core material 45 to prevent the side sill 22 and the rear side frame 23 from crumpling, and it is also possible to efficiently transmit the collision load of a side collision to the kick-up part 26 and support it.

Furthermore, since the fiber-reinforced plastic flat portion 45*c* extending upwardly from the partition wall portion 45*b* of the core material 45 of the kick-up part 26 is connected to the upper wall 22*e* of the side sill 22, and the flat portion 45*c* has at least a fiber orientation direction that is inclined downwardly from the outside toward the inside in the vehicle width direction (see FIG. 11), when the collision load of a side collision is inputted into the upper part of the side sill 22, it is possible to efficiently transmit the collision load to the core material 45 of the kick-up part 26 via the obliquely oriented fibers in the flat portion 45*c*.

Third Embodiment

Figure 13:
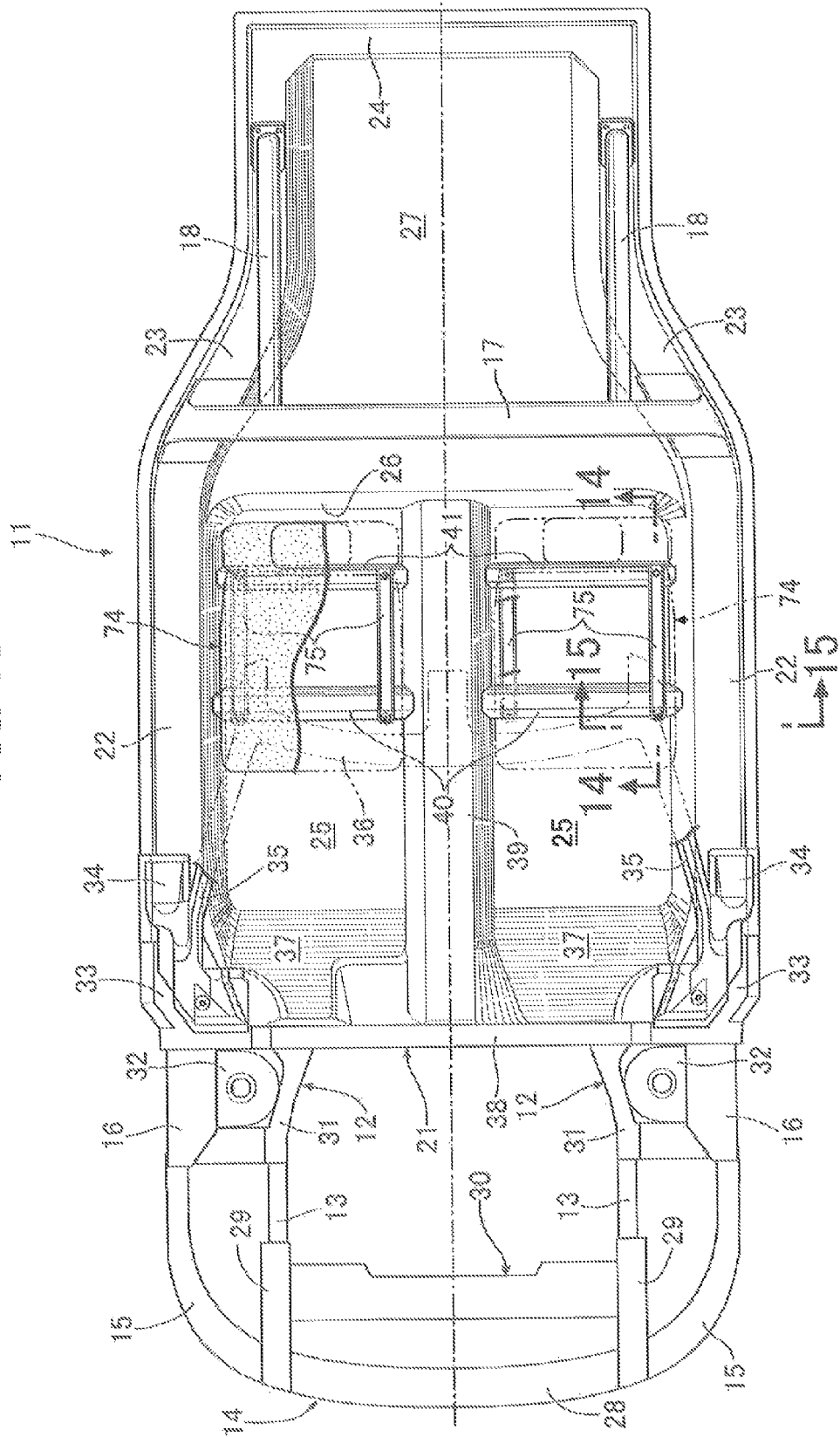
FIG. 13 is a view in the direction of arrow 13 in FIG. 1. (third embodiment)

A third embodiment the present invention is explained below by reference to FIG. 13 to FIG. 15.

A seat 74 is disposed on a front floor panel 25 on each of left and right sides of a floor tunnel 39. Each seat 74 is supported so as to be movable in the fore-and-aft direction on a pair of left and right seat rails 75 and 75 provided so as to bridge and connect a front cross member 40 and a rear cross member 41.

Figure 14:
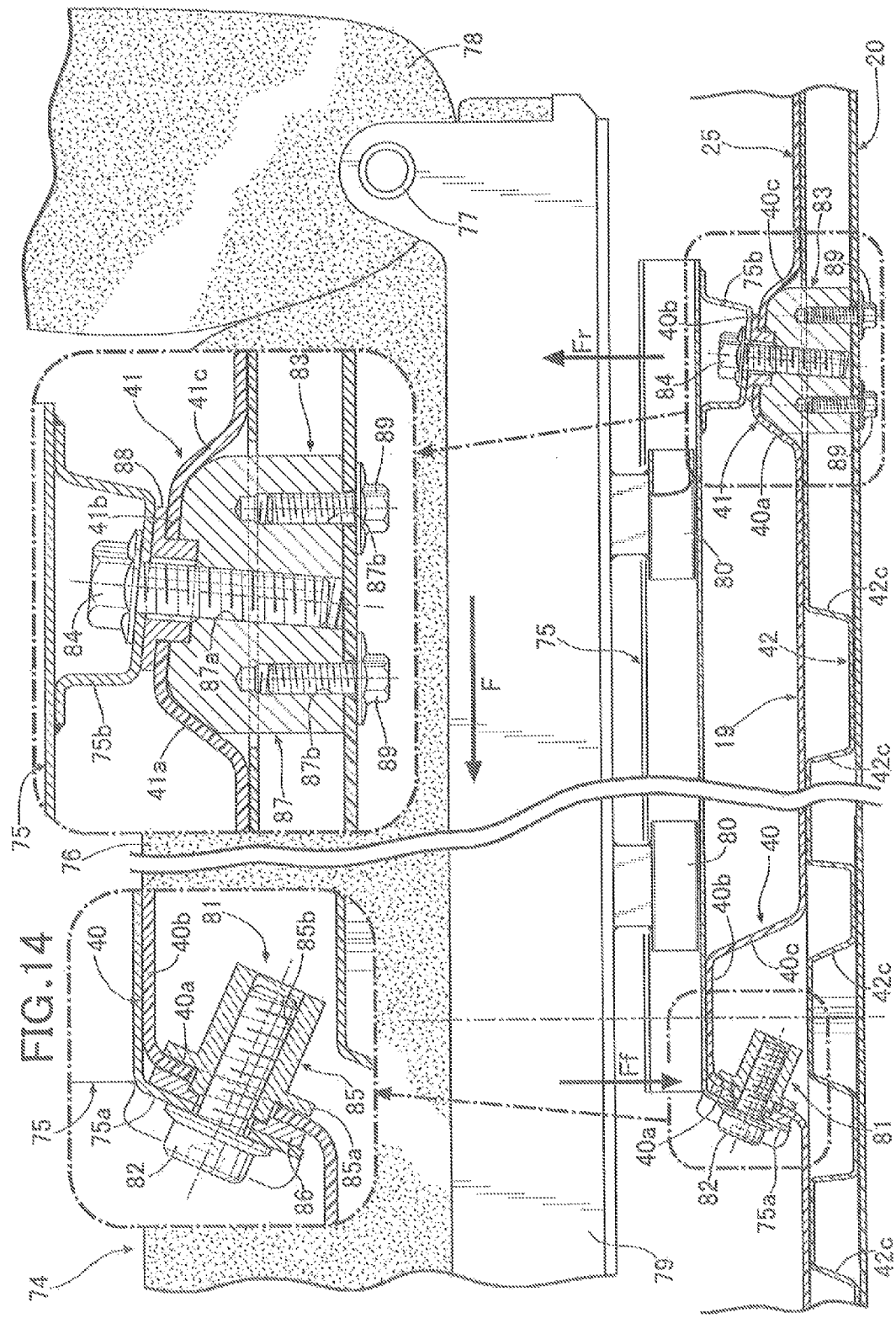
FIG. 14 is a sectional view along line 14-14 in FIG. 13. (third embodiment)
Figure 15:
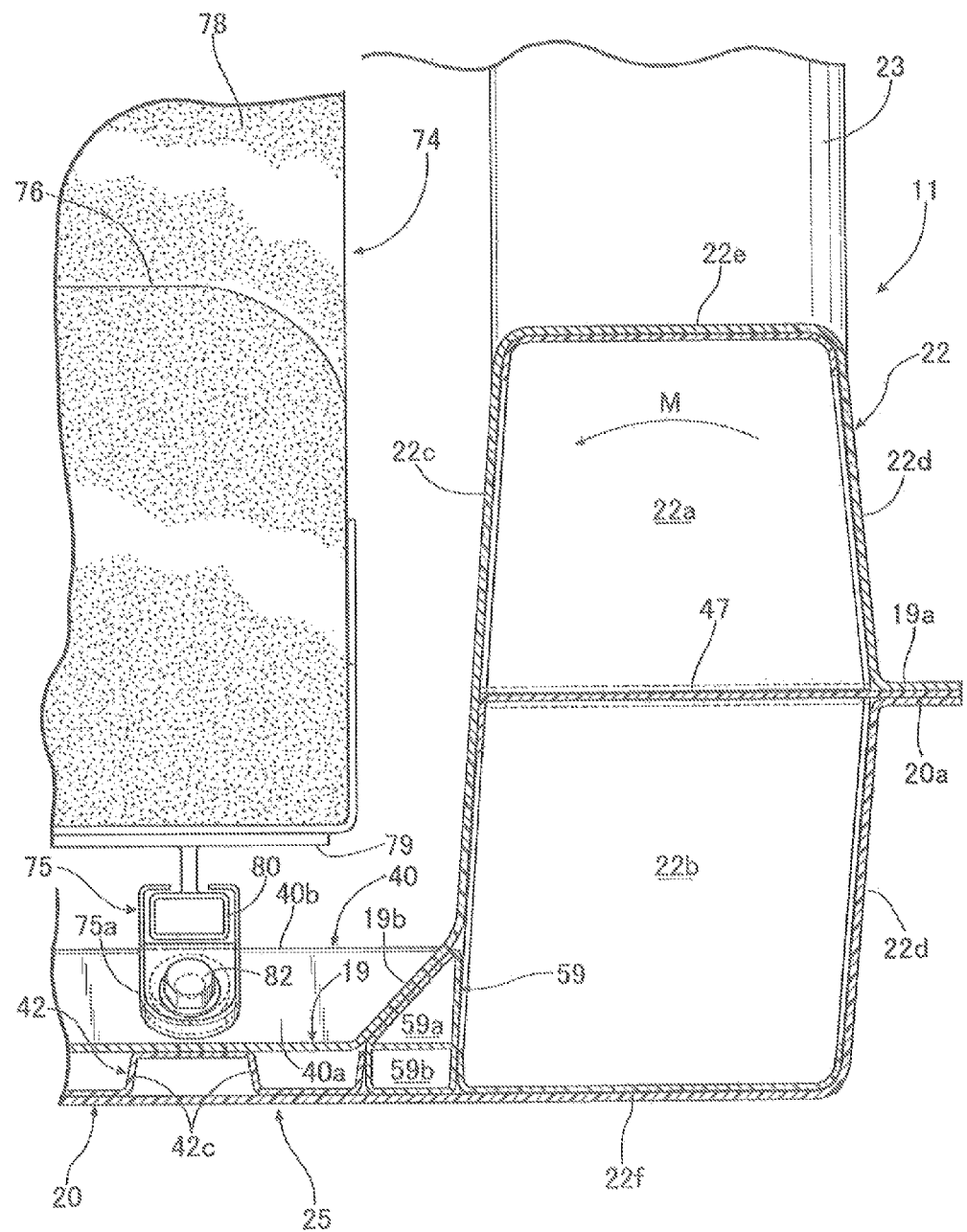
FIG. 15 is a sectional view along line 15-15 in FIG. 13. (third embodiment)

The seat 74 includes a seat cushion 76, and a seat back 78 supported at the rear end of the seat cushion 76 via a pivot 77 so as to be reclinable, and a pair of front and rear sliders 80 and 80 provided on a lower face of a seat frame 79 supporting a lower face of the seat cushion 76 are supported on each seat rail 75 so as to be slidable in the fore-and-aft direction (see FIG. 14 and FIG. 15). A front mounting portion 75a formed by bending the front end of the seat rail 75 downwardly toward the front is secured to a front insert member 81 provided on the front cross member 40 by means of a bolt 82, and a rear mounting portion 75b provided on a lower face at the rear end of the seat rail 75 is secured to a rear insert member 83 provided on the rear cross member 41 by means of a bolt 84.

The front cross member 40, which is formed by making part of an inner skin 19 bulge upwardly, extends in the vehicle width direction while having a front wall 40a, an upper wall 40b, and a rear wall 40c, and the front insert member 81 is fixed to the front wall 40a of the front cross member 40. The front insert member 81 is formed from a tubular main body part 85 having a circular flange 85a, and a circular washer 86 fitted to the main body part 85, the diameter of the washer 86 being set so as to be the same as the diameter of the flange 85a or greater. The flange 85a of the main body part 85 is adhered to the reverse face of the front wall 40a of the front cross member 40, and the washer 86 fitted at the front end of the main body part 85 is adhered to the face of the front wall 40a of the front cross member 40. A bolt 82 extending through the front mounting portion 75a of the seat rail 75, the washer 86, the front wall 40a of the front cross member 40, and the flange 85a of the main body part 85 is screwed into a female thread 85b formed on an inner peripheral face of the main body part 85, thus fixing a front part of the seat rail 75 to the front cross member 40.

The rear cross member 41 formed by making part of the inner skin 19 bulge upwardly extends in the vehicle width direction while having a front wall 41a, an upper wall 41b and, a rear wall 41c, and the rear insert member 83 is fixed to the upper wall 41b of the rear cross member 41 and the outer skin 20 opposing the underneath thereof. The rear insert member 83 is formed from a main body part 87 fitted to reverse faces of the front wall 41a, the upper wall 41b, and rear wall 41c of the rear cross member 41 and abutting against an upper face (reverse face) of the outer skin 20, and a washer 88 press fitted to the main body part 87 with the upper wall 41b of the rear cross member 41 sandwiched therebetween. A rear part of the seat rail 75 is fixed to the rear cross member 41 by screwing a bolt 84 extending through the rear mounting portion 75b of the seat rail 75, the washer 88, and the upper wall 41b of the rear cross member 41 into a female thread 87a of the main body part 87 and screwing bolts 89 extending through the outer skin 20 into female threads 87b of the main body part 87.

An inclined face 19b provided on the border between the floor panel 25 and a side sill 22 in the inner skin 19 and a frame member 59 reinforcing the inclined face 19b are positioned at a height that is substantially the same as that of the front cross member 40 (see FIG. 15).

The operation of the third embodiment of the present invention having the above arrangement is now explained.

The four seat rails 75 supporting the pair of left and right seats 74 and 74 on the front floor panel 25 are assembled by the procedure below. That is, the flange 85a of the main body part 85 of the front insert member 81 is adhered to the reverse face of the front wall 40a of the front cross member 40 of the front floor panel 25, the washer 86 fitted to the front end of the main body part 85 is adhered to the face of the front wall 40a of the front cross member 40, and the front insert member 81 is thereby fixed to the front cross member 40.

Furthermore, the main body part 87 of the rear insert member 83 is sandwiched between the reverse faces of the front wall 41a, the upper wall 41b, and the lower wall 41c of the rear cross member 41 of the front floor panel 25, and the upper face (reverse face) of the outer skin 20 positioned beneath the rear cross member 41, the bolts 89 extending through the outer skin 20 from bottom to top are screwed into the female threads 87b of the main body part 87, and the main body part 87 is thereby fixed to the outer skin 20. Moreover, the washer 88 is press fitted to the upper end of the main body part 87 so as to sandwich the upper wall 41b of the rear cross member 41, and the rear insert member 83 is thereby fixed to the rear cross member 41 and the outer skin 20.

In this state, the bolt 82 inserted into the front mounting portion 75a of the seat rail 75 from the front to the rear extends through the washer 86, the front wall 40a of the front cross member 40, and the flange 85a of the main body part 85 and is screwed into the female thread 85b of the main body part 85, and the front mounting portion 75a of the seat rail 75 is thereby fixed to the front cross member 40. Furthermore, the bolt 84 inserted into the rear mounting portion 75b of the seat rail 75 from top to bottom extends through the washer 86 and the upper wall 41b of the rear cross member 41 and is screwed into the female thread 87a of the main body part 87, and the rear mounting portion 75b of the seat rail 75 is thereby fixed to the rear cross member 41.

When a vehicle is involved in a frontal collision and deceleration occurs, since a forward-facing inertial force F acts on the seat 74 and an occupant seated on the seat 74 (see FIG. 14), a moment that acts on the seat 74 having the lower end fixed to the front floor panel 25 so as to collapse it forwardly is generated. As a result, a downward-facing load Ff acts on the front insert member 81 from the front mounting portion 75a of the seat rail 75, and an upward-facing load Fr acts on the rear insert member 83 from the rear mounting portion 75b of the seat rail 75.

Since the upward-facing load Fr acts on the rear cross member 41 so as to pull it away from the core material 42, high strength is required for the vicinity of the rear cross member 41. However, since the main body part 87 of the rear insert member 83 is fixed to both the upper wall 41b of the rear cross member 41 and the outer skin 20, the upward-facing load Fr is supported by both the inner skin 19 and the outer skin 20, thus preventing the rear cross member 41 from being broken.

On the other hand, since the downward-facing load Ff acts so as to press the front cross member 40 against the core material 42, the vicinity of the front cross member 40 only requires low strength. In this arrangement, the main body part 87 of the front insert member 81 is fixed only to the front wall 40a of the front cross member 40 and is not fixed to the outer skin 20, but since as described above the vicinity of the front cross member 40 only requires low strength, the front cross member 40 will not be broken. Since it is not necessary to fix the front insert member 81 to the outer skin 20, the dimensions can be reduced, the weight can be cut, and it is possible to lighten the weight.

In particular, since the rear insert member 83 is formed from the main body part 87 fitted to the reverse faces of the front wall 41a, the upper wall 41b, and the rear wall 41c of the rear cross member 41 and fixed by the bolts 89 to the reverse face of the outer skin 20 so as to abut thereagainst, and the washer 88 press fitted to the main body part 87 with the upper wall 41b of the rear cross member 41 sandwiched therebetween, it is possible, by strongly supporting a load in the fore-and-aft direction applied from the seat 74 to the rear insert member 83 during normal travel by transmitting it to the rear cross member 41 and the outer skin 20, to enhance the seating comfort, and even when a large load in the fore-and-aft direction is applied when there is a frontal collision, it is possible to strongly fix the seat 74 without reinforcing the floor panel 25 by specially making it thick.

Furthermore, since the front insert member 81 is secured to the front wall 40a of the front cross member 40 by means of the bolt 82, it becomes possible to screw in the bolt 82 from a large space in front of the seat 74, thus improving the workability. If the front insert member 81 were fixed to the horizontal upper wall 40b of the front cross member 40, the front cross member 40 would easily be collapsed by the downward-facing load Ff, but since it is fixed to the substantially vertical front wall 40a of the front cross member 40, it is possible to efficiently transmit the downward-facing load Ff to the core material 42, thus enhancing the strength of the front cross member 40.

In particular, since the front insert member 81 is formed from the main body part 85 having the flange 85a and the washer 86 having a diameter that is the same as or greater than that of the flange 85a and fitted to the main body part 85, the flange 85a is adhered to the reverse face of the front wall 40a of the front cross member 40, and the washer 86 is adhered to the face of the front wall 40a of the front cross member 40, it is possible to strongly support a load in the fore-and-aft direction applied from the seat 74 to the front insert member 81 during normal travel by transmitting it to the front cross member 40, thus enhancing the seating comfort.

Embodiments of the present invention are explained above, but the present invention may be modified in a variety of ways as long as the modifications do not depart from the spirit and scope thereof.

For example, in the embodiments the cabin 11, etc. is formed from a carbon fiber-reinforced plastic, but it may be formed from a fiber-reinforced plastic (fiber-reinforced resin) using a fiber other than carbon fiber.

Furthermore, in the embodiment the apex a of the triangular shape of the front insert member 93 is oriented to the outside in the vehicle width direction, but the same operational effects can be obtained when it is oriented to the inside in the vehicle width direction.

Moreover, the floor panel of the present invention is not limited to the inclined wall 37 of the dash panel 21 of the embodiment.

The invention claimed is:

1. A fiber-reinforced plastic cabin for a vehicle, which fiber-reinforced plastic cabin comprises a floor panel formed by sandwiching a core material between an inner skin positioned on an inside of a vehicle compartment and an outer skin positioned on an outside of the vehicle compartment, and in which a subframe, for supporting a suspension system, is secured to an insert member embedded in the core material, wherein:

the core material is formed from a corrugated plate having a number of concave-convex portions extending in a fore-and-aft direction, and one apex of the insert member, which forms a triangular shape when viewed from above, is directed to the outside or the inside in a vehicle width direction, and two sides of the insert member proximate the apex abut against the core material.

2. The fiber-reinforced plastic cabin for a vehicle according to claim 1, wherein a subframe support member, which supports the subframe, is secured to the insert member at three apexes of the triangular shape, a bulge portion bulging into the insert member is formed on the subframe support member, and a bolt hole into which a bolt securing the subframe to the subframe support member is screwed extends to an interior of the bulge portion.

3. The fiber-reinforced plastic cabin for a vehicle according to claim 2, wherein in a state in which the outer skin is sandwiched between the subframe support member and the insert member, the insert member and the subframe support member are secured by a first bolt inserted into a securing hole, formed in the insert member, from an inner skin side, and the inner skin is secured to the insert member by a second bolt inserted into the securing hole from the inner skin side.

4. The fiber-reinforced plastic cabin for a vehicle according to claim 1, wherein the cabin comprises side sills extending rearwardly from opposite sides in the vehicle width direction of the floor panel, and a front end of a partition member partitioning an interior of the side sill into an upper space and a lower space is positioned proximate the insert member.

5. The fiber-reinforced plastic cabin for a vehicle according to claim 1, wherein a front floor panel connected to the rear of the floor panel is formed by sandwiching between the inner skin and the outer skin a core material comprising a corrugated plate having a number of concave-convex portions extending in the fore-and-aft direction, the concave-convex portion of the core material of the floor panel being continuous with the concave-convex portion of the core material of the front floor panel.

6. The fiber-reinforced plastic cabin for a vehicle according to claim 1, wherein a front floor panel, which provides a connection between left and right side sills of the cabin, is formed by sandwiching a core material between the inner skin and the outer skin, the front floor panel is divided into left and right front regions and left and right rear regions by a floor tunnel extending in the fore-and-aft direction in a middle part in the vehicle width direction of the inner skin and a cross member extending in the vehicle width direction in a middle part in the fore-and-aft direction of the inner skin, the core material in the left and right front regions comprises a concave-convex portion extending in a ripple shape forwardly and inwardly in the vehicle width direction from the cross member and the side sill, and the core material in the left and right rear regions comprises a concave-convex portion extending in a ripple shape rearwardly and inwardly in the vehicle width direction from the cross member and the side sill.

7. The fiber-reinforced plastic cabin for a vehicle according to claim 6, wherein the core material in the left and right front regions comprises the concave-convex portion extending in a ripple shape with a front side of the side sill connected thereto as a center, and the core material in the left and right rear regions comprises the concave-convex portion extending in a ripple shape with a rear side of the side sill connected thereto as a center.

8. The fiber-reinforced plastic cabin for a vehicle according to claim 7, wherein the core material in the left and right front regions comprises a linear concave-convex portion extending forwardly from an end part of the ripple-shaped concave-convex portion, and the core material in the left and right rear regions comprises a linear concave-convex portion extending rearwardly from an end part of the ripple-shaped concave-convex portion.

9. The fiber-reinforced plastic cabin for a vehicle according to claim 8, wherein the cabin comprises a dash panel formed from the floor panel extending in an inclined manner obliquely upwardly from a front end of the floor panel and a vertical wall extending upwardly from the front end of the floor panel, the floor panel is formed by sandwiching the core material between the inner skin and the outer skin, and the concave-convex portion formed in the core material of the floor panel and extending linearly in the fore-and-aft direction is connected to the linear concave-convex portion of the core material in the left and right front regions.

10. The fiber-reinforced plastic cabin for a vehicle according to claim 6, wherein an inclined face extending in the fore-and-aft direction is formed on a border between the floor panel and the side sill in the inner skin, and the inclined face and the outer skin are joined to a frame member extending in the fore-and-aft direction.

11. The fiber-reinforced plastic cabin for a vehicle according to claim 10, wherein the frame member is a tubular hollow member.

12. The fiber-reinforced plastic cabin for a vehicle according to claim 6, wherein a rear wall extending in the vehicle width direction rises from a rear end of the floor panel, and opposite end parts in the vehicle width direction of the rear wall protrude into a cross section of the side sill.

13. The fiber-reinforced plastic cabin for a vehicle according to claim 1, wherein the inner skin comprises a front cross member extending in the vehicle width direction while having a front wall, an upper wall, and a rear wall, and a rear cross member extending in the vehicle width direction while having a front wall, an upper wall and a rear wall, a front insert member supporting a front part of a seat is fixed to the front wall of the front cross member, and a rear insert member supporting a rear part of the seat is fixed to the upper wall of the rear cross member and the outer skin.

14. The fiber-reinforced plastic cabin for a vehicle according to claim 13, wherein the front insert member comprises a main body part having a flange, and a washer having a diameter that is the same as that of the flange or greater and fitted to the main body part, the flange is adhered to a reverse face of the front wall of the front cross member, and the washer is adhered to a face of the front wall of the front cross member.

15. The fiber-reinforced plastic cabin for a vehicle according to claim 13, wherein the rear insert member is fitted to reverse faces of the front wall, the upper wall, and the rear wall of the rear cross member, and comprises a main body part abutting against the reverse face of the outer skin and fixed by a bolt, and a washer press fitted to the main body part with the upper wall of the rear cross member sandwiched therebetween.

16. The fiber-reinforced plastic cabin for a vehicle according to claim 13, wherein the cabin comprises a side sill connected integrally to an outer side in the vehicle width direction of the floor panel, an inclined face extending in the fore-and-aft direction is formed on a border between the floor panel and the side sill in the inner skin, the inclined face and the outer skin are joined by a frame member extending in the fore-and-aft direction, and the height of the front cross member is set so as to substantially coincide with the height of the inclined face.

17. The fiber-reinforced plastic cabin for a vehicle according to claim 13, wherein the core material comprises left and right core materials sandwiching a vehicle body center line and front halves of the left and right core materials comprise a concave-convex portion formed into a ripple shape with a front side of the side sill connected thereto as a center, rear halves of the left and right core materials sandwiching the vehicle body center line comprise a concave-convex portion formed into a ripple shape with a rear side of the side sill connected thereto as a center, and the front cross member is positioned on a border between the front half and the rear half of each of the core materials.

18. A fiber-reinforced plastic cabin for a vehicle comprising:
a floor panel, which provides a connection between left and right side sills of a cabin, being formed by sandwiching a core material between an inner skin and an outer skin, and
wherein:
the floor panel being divided into left and right front regions and left and right rear regions by a floor tunnel, extending in a fore-and-aft direction in a middle part in a vehicle width direction of the inner skin;
a cross member extending in a middle part in the fore-and-aft direction of the inner skin,
the core material in the left and right front regions comprises a concave-convex portion extending in a ripple shape forwardly and inwardly in the vehicle width direction from the cross member and the side sill, and
the core material in the left and right rear regions comprises a concave-convex portion extending in a ripple shape rearwardly and inwardly in the vehicle width direction from the cross member and the side sill.

19. The fiber-reinforced plastic cabin for a vehicle according to claim 18, wherein the core material in the left and right front regions comprises the concave-convex portion extending in a ripple shape with a front side of the side sill connected thereto as a center, and the core material in the left and right rear regions comprises the concave-convex portion extending in a ripple shape with a rear side of the side sill connected thereto as a center.

20. The fiber-reinforced plastic cabin for a vehicle according to claim 19, wherein the core material in the left and right front regions comprises a linear concave-convex portion extending forwardly from an end part of the ripple-shaped concave-convex portion, and the core material in the left and right rear regions comprises a linear concave-convex portion extending rearwardly from an end part of the ripple-shaped concave-convex portion.

* * * * *